United States Patent
Gosho et al.

(12) 
(10) Patent No.: US 6,589,694 B1
(45) Date of Patent: Jul. 8, 2003

(54) POSITIVE ELECTRODE ACTIVE MATERIAL, POSITIVE ELECTRODE ACTIVE MATERIAL COMPOSITION AND LITHIUM ION SECONDARY BATTERY

(75) Inventors: Itaru Gosho, Itami (JP); Ken Moriuchi, Itami (JP); Kenichi Kizu, Itami (JP); Toshihiro Zushi, Itami (JP); Masahiro Kamauchi, Itami (JP); Mitsuhiro Asano, Anjo (JP); Kazuyuki Tateishi, Amagasaki (JP)

(73) Assignee: Mitsubishi Cable Industries, Ltd., Amagasaki (JP)

( * ) Notice: Subject to any disclaimer, the term of this patent is extended or adjusted under 35 U.S.C. 154(b) by 0 days.

(21) Appl. No.: 09/570,594

(22) Filed: May 12, 2000

(30) Foreign Application Priority Data

| May 14, 1999 | (JP) | 11-133497 |
| Aug. 2, 1999 | (JP) | 11-219326 |
| Aug. 5, 1999 | (JP) | 11-223089 |
| Aug. 25, 1999 | (JP) | 11-238785 |
| Oct. 12, 1999 | (JP) | 11-290300 |
| Nov. 15, 1999 | (JP) | 11-324602 |

(51) Int. Cl.[7] .......................... H01M 4/58; H01M 4/60; H01M 6/16

(52) U.S. Cl. ................. 429/231.1; 429/212; 429/218.1; 429/231.3; 429/231.8; 429/231.95; 429/338

(58) Field of Search .................. 429/326, 218.1, 429/231.1, 231.3, 232, 212, 338, 231.8, 231.95, 231.9, 231.4

(56) References Cited

U.S. PATENT DOCUMENTS

| 5,494,762 A | * | 2/1996 | Isoyama et al. | 429/194 |
| 5,561,005 A | | 10/1996 | Omaru et al. | |
| 5,698,341 A | * | 12/1997 | Tamaki et al. | 429/218 |
| 5,789,114 A | * | 8/1998 | Adachi et al. | 429/232 |
| 5,795,678 A | * | 8/1998 | Takami et al. | 429/218 |
| 6,019,802 A | * | 2/2000 | Ishizuka et al. | 29/623.5 |

OTHER PUBLICATIONS

Patent Abstract of Japan, Abstract of JP 06 036802 (Nippon Steel Corp. and Nippon Steel Chem. Co., Ltd.) (1998).

* cited by examiner

*Primary Examiner*—Patrick Ryan
*Assistant Examiner*—Julian Mercado
(74) *Attorney, Agent, or Firm*—Leydig, Voit & Mayer, Ltd.

(57) ABSTRACT

The present invention relates to a positive electrode active material, a negative electrode active material and an electrolyte that are used alone or in combination to improve charge and discharge cycle characteristic, low temperature characteristic and safety of a non-aqueous electrolyic secondary battery, particularly a lithium ion secondary battery. Specifically, a particulate Li-transition metal composite oxide having an average particle size of not less than 10 $\mu$m, wherein [20/(specific surface area×average particle size)]= 7–9, is used as a positive electrode active material.

21 Claims, 3 Drawing Sheets

F I G. 2
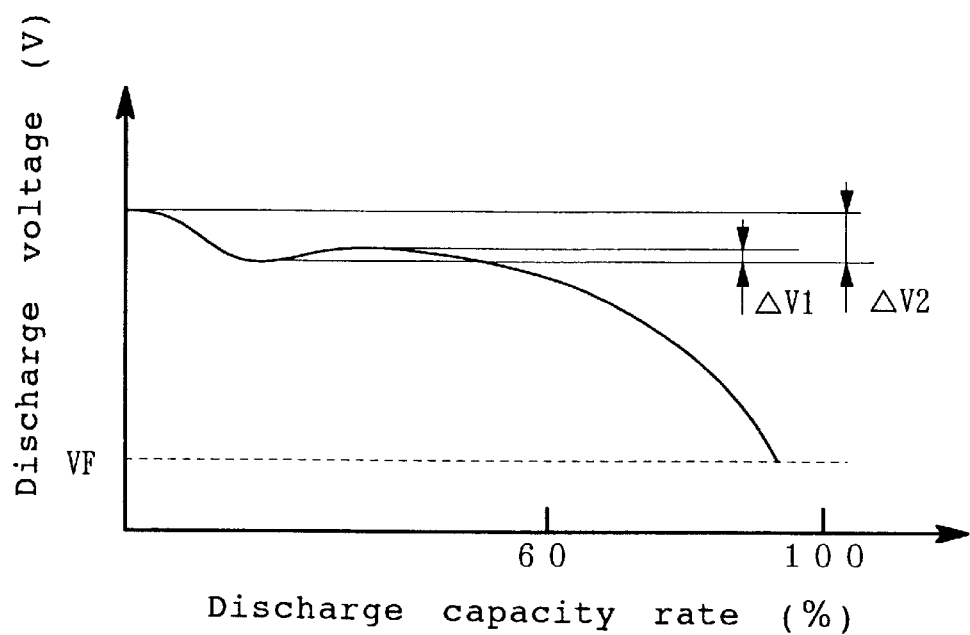

POSITIVE ELECTRODE ACTIVE MATERIAL, POSITIVE ELECTRODE ACTIVE MATERIAL COMPOSITION AND LITHIUM ION SECONDARY BATTERY

TECHNICAL FIELD OF THE INVENTION

The present invention relates to a non-aqueous electrolytic secondary battery. More particularly, the present invention relates to an improvement in a lithium ion secondary battery, specifically, a positive electrode active material capable of improving charge and discharge cycle characteristic and safety of lithium ion secondary battery, a positive electrode active material composition, and to a lithium ion secondary battery having improved charge and discharge cycle characteristic, low temperature characteristic and safety.

BACKGROUND OF THE INVENTION

Lithium ion secondary batteries have superior electromotive force and battery capacity, and are more advantageous than nickel-cadmium battery etc. in that they show high energy density, high voltage etc. While they have been drawing much attention in recent years, they have been more often employed as driving force of portable devices, such as cellular phones and note type personal computers. Motivated by the situation as described, various studies have been undertaken in the pertinent field to provide a higher performance product. To be specific, such studies focus on the properties and preferable combinations of the constituent materials of the Lithium ion secondary batteries: positive electrode active materials, negative electrode active materials, electrolytes and the like.

As a positive electrode active material for lithium ion secondary batteries, there have been proposed a number of Li-transition metal composite oxides, such as Li—Mn type composite oxide, Li—Ni type composite oxide, Li—Co type composite oxide and the like. Of these, Li—Co type composite oxides have been predominantly put into practice, because they are chemically stable, can be handled easily and are capable of producing secondary batteries having high capacity. There are many suggestions and reports to further improve Li—Co type composite oxides to ultimately improve the properties of the secondary battery that uses a Li—Co type composite oxide as a positive electrode active material. For example, JP-B-7-118318 discloses that $LiCoO_2$ can improve the discharge capacity of a secondary battery, which $LiCoO_2$ is obtained by adding a rich amount of a lithium compound and a cobalt compound, heating the compounds and removing, by washing with water, unreacted lithium compound and lithium carbonate byproduct in the reaction product.

Mostly, the positive electrode active material for a lithium ion secondary battery is a layer made from a composition (hereinafter to be also referred to as a positive electrode active material composition) consisting of a conductive material and a binder made from an organic polymer. As the conductive material, various graphites and carbon black are used. The positive electrode active material is generally used in the form of particles, each particle dispersed in a non-conductive binder in the composition. Absence of a conductive material leads to an electrically insulated state of each particle in the positive electrode active material due to the action of the binder, which in turn makes the layer of the positive electrode active material composition (hereinafter to be also referred to as a positive electrode active material layer) substantially electrically insulating. The conductive material is used to make this layer conductive by its presence between the particles of the positive electrode active material to electrically connect the particles. Consequently, the positive electrode active material layer as a whole becomes conductive. The positive electrode active material is used in the form of particles as mentioned earlier. When the particle size is too small, the reactivity during charge and discharge of a secondary battery sometimes becomes too great to the extent that abnormal cell reaction is induced to a dangerous level. The present inventors have found that, from the aspect of the safety of the secondary battery, the preferable average particle size of a positive electrode active material is not less than 10 $\mu$m. However, an average particle size of not less than 10 $\mu$m lowers the conductivity of the positive electrode active material layer, frequently causing degraded charge and discharge cycle characteristic.

With regard to the negative electrode active material and electrolyte, for example, JP-A-6-36802 discloses that charge and discharge cycle characteristic of a lithium ion secondary battery can be improved by using a positive electrode active material made from a Li-transition metal composite oxide, a negative electrode active material made from a specific pitch type carbon fiber, and a mixed solvent of one or more members from a group of ethylene carbonate, propylene carbonate, butylene carbonate, γ-butyrolactone, sulfolane, 3-methylsulfolane, tetrahydrofuran, 2-methyltetrahydrofuran, acetonitrile, dimethoxyethane, diethoxyethane, dimethylsulfoxide, dioxolane, 4-methyldioxolane and diethyl carbonate, as an electrolyte. U.S. Pat. No. 5,561,005 discloses that charge and discharge cycle characteristic of a lithium ion secondary battery can be improved by using a positive electrode active material made from a Li-transition metal composite oxide, a graphite type carbon material as a negative electrode active material, and a mixed solvent of ethylmethyl carbonate and dimethyl carbonate as an electrolyte, and further a mixture of this mixed solvent and ethylene carbonate or propylene carbonate as an additional component. When such component is to be added, it should be noted that addition of propylene carbonate to a graphite type carbon material as the negative electrode active material results in the decomposition of the solvent, and in this case, therefore, ethylene carbonate is preferably used. When the negative electrode active material is a carbon material other than graphite, propylene carbonate is preferably used (see paragraph 59).

As mentioned above, lithium ion secondary battery has many superior characteristics as compared to nickel-cadmium battery etc., in high energy density, high voltage and the like. On the other hand, it has unpreferable low temperature characteristic in that discharge at a low temperature results in lower discharge capacity and lower discharge voltage than in the case of discharge at room temperature. Particularly, at an extremely low temperature of not more than −20° C. (and not more than −35° C.), the discharge voltage shows a sharp drop at the initial stage of discharge. In the discharge curve [axis of abscissas: discharge capacity rate (%), axis of ordinate: discharge voltage (V)] of lithium ion secondary battery at a low temperature, the minimum value and the maximum value sequentially appear in the direction of increase of the discharge capacity rate. However, at an extremely low temperature of not more than −20° C., the difference between the minimum value and the maximum value becomes about 0.3 (V)–0.5 (V) and the difference between the minimum value and the discharge voltage, when the discharge capacity rate is 0%, becomes about 0.5 (V)–1.0 (V). This causes a drastic drop of voltage at the initial stage of discharge. In effect, the discharge voltage could fall under the stop voltage set for each equipment, thereby making the equipment practically unoperatable. This problem of low temperature characteristic prevents application of the battery to observation monitors, communication devices, electric automobiles, electric power reservoir and the like, that may be used in frigid places. While some measure for preventing the battery from falling to a temperature below a certain level by, for example, placing the battery in a warmer place or applying a heater, will enable use of the battery for the above-mentioned equipment, this results in an increased cost of the equipment. Therefore, the major problem of the lithium ion secondary battery is to overcome the low temperature characteristic. Lithium ion secondary battery typically has a structure wherein a positive electrode sheet and a negative electrode sheet are opposed via a separator, and an electrolyte fills the gap between the both electrodes. The positive (negative) electrode is produced by forming a positive (negative) electrode active material layer made from a positive (negative) electrode active material, a conductive material and a binder on a current collector such as a metal foil. The positive electrode active material and the negative electrode active material are particulate as mentioned above, including gaps due to the particles. This allows the electrolyte to pass through the gap into the electrode, where chemical change occurs for charge and discharge. More active chemical change in the electrode enables improvement in the battery capacity, rate characteristic, and low temperature characteristic. A sufficient gap may be secured by enlarging the particles of the active material, but a greater particle size reduces the filling density of the active material and battery capacity per volume. An electrolyte that does not show an increased viscosity at a low temperature is considered to improve low temperature characteristic, because it allows penetration of electrolyte into the electrode at a low temperature without decreasing the density of the active material. In conventional electrolytes, however, a lower viscosity is associated with a higher freezing point. For example, dimethyl carbonate, which is among the components typically added to an electrolyte, lowers the viscosity of an electrolyte when added in greater amounts, but conversely raises the freezing point of the electrolyte.

SUMMARY OF THE INVENTION

It is therefore an object of the present invention to provide an improved Li-transition metal composite oxide that is used as a positive electrode active material of a non-aqueous electrolyte secondary battery, particularly lithium ion secondary battery, and that is capable of improving charge and discharge cycle characteristic of a battery, as well as a lithium ion secondary battery containing the Li-transition metal composite oxide as a positive electrode active material (a first lithium ion secondary battery).

The present invention also aims at providing a positive electrode active material composition having an improved conductivity, which contains a positive electrode active material (Li-transition metal composite oxide) having an average particle size of not less than 10 $\mu$m, which is preferable for the safety of the secondary battery, as well as a lithium ion secondary battery containing this positive electrode active material composition (a second lithium ion secondary battery).

The present invention further aims at providing a lithium ion secondary battery noticeably improved in charge and discharge cycle characteristic due to the combination of a novel negative electrode active material capable of improving charge and discharge cycle characteristic, and an electrolyte (a third lithium ion secondary battery).

The present invention yet aims at providing a lithium ion secondary battery having sufficiently improved charge and discharge cycle characteristic, storage characteristic and low temperature characteristic, without decreasing energy density (a fourth lithium ion secondary battery).

Further, the present invention aims at providing a lithium ion secondary battery free of reduction in the discharge capacity and discharge voltage at a low temperature (not more than −20° C., particularly not more than −35° C.), which is attributable to the use of a specific electrolyte having a low viscosity, and therefore, free of solidification under low temperature (a fifth lithium ion secondary battery). The present invention further aims at providing a lithium ion secondary battery free of a sharp drop of the discharge voltage at the initial stage of discharge under an extremely low temperature, particularly not more than −20° C. (a sixth lithium ion secondary battery).

To achieve the above-mentioned objects, the present invention has the following characteristics.

In a first aspect of the present invention, a particulate Li-transition metal composite oxide having an average particle size of not less than 10 $\mu$m, wherein [20/(specific surface area×average particle size) ]=7–9, is used as a positive electrode active material, thereby to improve charge-discharge cycle characteristic.

In a second aspect of the present invention, a particulate Li-transition metal composite oxide having an average particle size of not less than 10 $\mu$m is used as a positive electrode active material, and a mixture of a conductive material having a large particle size and a conductive material having a small particle size is used alongside, thereby to improve safety and charge-discharge cycle characteristic of the battery.

In a third aspect of the present invention, graphitized carbon having a specific surface area of not more than 2.0 $m^2/g$, a spacing of lattice planes (d002) of not more than 0.3380 nm and a crystallite size in the c-axis direction (Lc) of not less than 30 nm is used as a negative electrode active material, and a mixed solvent for an electrolyte, which comprises ethylene carbonate, propylene carbonate, dimethyl carbonate and at least one member selected from the group consisting of diethyl carbonate and ethylmethyl carbonate is used, thereby to improve charge-discharge cycle characteristic.

In a fourth aspect of the present invention, a particulate Li-transition metal composite oxide having an average particle size of not less than 10 $\mu$m, wherein [20/(specific surface area×average particle size) ]=7–9, is used as a positive electrode active material, a mixture of a conductive material having a large particle size and a conductive material having a small particle size is used as a conductive material, graphitized carbon having a specific surface area of not more than 2.0 $m^2/g$, a spacing of lattice planes (d002) of not more than 0.3380 nm and a crystallite size in the c-axis direction (Lc) of not less than 30 nm is used as a negative electrode active material, and a mixed solvent for an electrolyte, which comprises ethylene carbonate, propylene carbonate, dimethyl carbonate and at least one member selected from the group consisting of diethyl carbonate and ethylmethyl carbonate is used, thereby to improve charge-discharge cycle characteristic, storage characteristic and low temperature characteristic.

In a fifth aspect of the present invention, a mixed solvent for an electrolyte is used, which comprises ethylene carbonate in a proportion of 4% by volume–10% by volume, propylene carbonate in a proportion of 10% by volume–17% by volume, dimethyl carbonate in a proportion of 30% by volume–40% by volume, and at least one member selected from the group consisting of diethyl carbonate and ethylmethyl carbonate in a proportion of 40% by volume—50% by volume, thereby to inhibit reduction of discharge capacity and discharge voltage at −20° C. or below.

In a sixth aspect of the present invention, a lithium ion secondary battery shows, upon 1 C discharge at −20° C., (i) a backslash discharge curve without a minimum value, or (ii) a discharge curve with a minimum value and a maximum value appearing in the discharge capacity rate increasing direction, or (iii) a discharge curve with a first maximum value, a minimum value and a second maximum value appearing in the discharge capacity rate increasing direction, these three curves plotted in the coordinate where the axis of abscissa shows a discharge capacity rate based on a discharge capacity (100%) upon 1 C discharge at 20° C., and the axis of ordinate shows a discharge voltage, wherein, in the case of the curve of (ii), a difference between the minimum value and the maximum value is not more than 0.1 V, and a difference between the minimum value and a discharge voltage, when the discharge capacity rate is 0%, is not more than 0.3 V, and, in the case of the curve of (iii), a difference between the minimum value and the second maximum value is not more than 0.1 V, and a difference between the minimum value and a discharge voltage, when the discharge capacity rate is 0%, is not more than 0.3 V, which battery showing a discharge capacity upon 1 C discharge at −20° C. of not less than 60% of the discharge capacity upon discharge at 20° C.

BRIEF DESCRIPTION OF THE DRAWINGS

FIG. 2 shows another example of the discharge curve of the lithium ion secondary battery of the present invention.

DETAILED DESCRIPTION OF THE INVENTION

Figure 1:
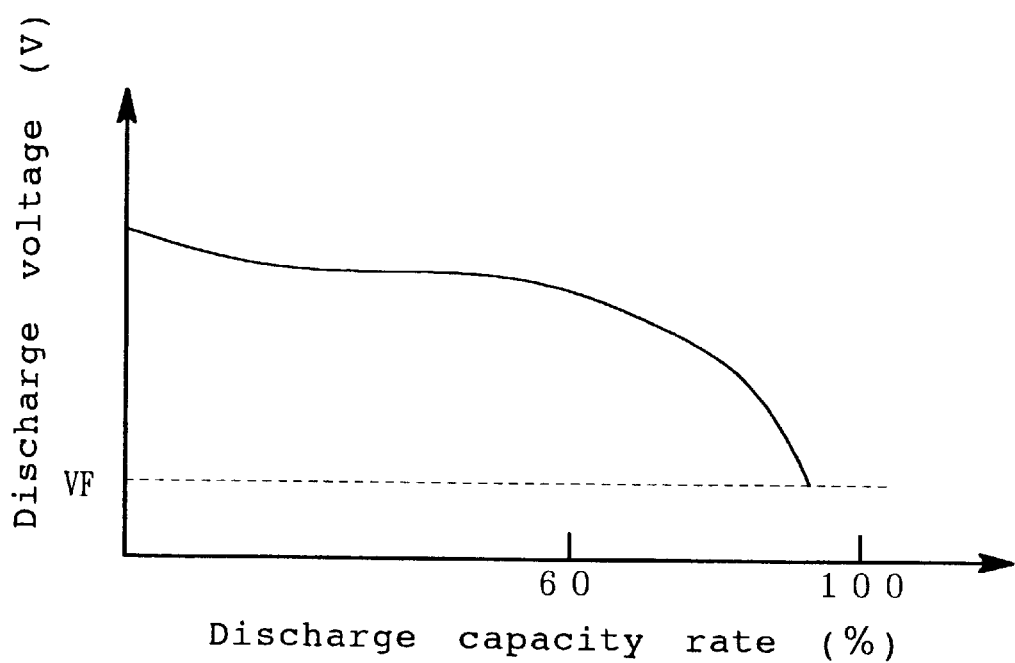
FIG. 1 shows one example of the discharge curve of the lithium ion secondary battery of the present invention.

The present invention will become apparent from the detailed description in the following.

The Li-transition metal composite oxide of the present invention is a particulate matter wherein the product of specific surface area ($m^2/g$) and average particle size ($\mu m$) satisfies the following formula $$7 \leq [20/(\text{specific surface area} \times \text{average particle size})] \leq 9$$

and is used as a positive electrode active material for a non-aqueous electrolyte secondary battery, such as lithium ion secondary battery. The first lithium ion secondary battery of the present invention contains this Li-transition metal composite oxide as a positive electrode active material.

The Li-transition metal composite oxide wherein the specific surface area and the average particle size show a specific relationship as expressed by the formula (1) is exemplified by those having the following formula (2) or (3):

$$Li_A M_{1-X} Me_X O_2 \quad (2)$$

wherein M is a transition metal such as Co, Ni, Mn, V, Ge and the like, and $$Li_A M_{2-X} Me_X O_4 \quad (3)$$

wherein M is a transition metal such as Mn, Fe, Ni and the like. In the formulas (2) and (3), Me is a 3–10 group element in the periodic table, such as Zr, V, Cr, Mo, Fe, Co, Mn, Ni and the like, or a 13–15 group element, such as B, Al, Ge, Pb, Sn, Sb and the like, provided that Me and M are different elements and Me may consist of two or more kinds of elements.

A in the formula (2) is 0.05–1.5, preferably 0.1–1.1, and in the formula (3), it is 0.05–2.5, preferably 0.5–1.5. X in the formula (2) and (3) is 0 or 0.01–0.5, preferably 0.02–0.2. When Me consists of two or more kinds of elements, X is the total number of the two or more kinds of elements.

Preferable examples of the Li-transition metal composite oxide of the formulas (2) and (3) include Li—Co type composite oxides such as $LiCoO_2$, $LiNiO_2$, $LiMnO_2$, $LiMn_{(1-X)}Al_X O_2$, $LiMn_{(1-X)}Co_X O_2$, $LiMn_{(1-X-Y)}Al_X Co_Y O_2$, $LiMn_2 O_4$, $LiMn_{2-X}Co_X O_4$, $LiMn_{2-X}Co_X Ge_Y O_4$, $LiCo_{(1-X)}Ni_X O_2$, $LiNi_{(1-X)}Al_X O_2$, $LiCo_{(1-X)}Mn_X O_2$ and the like, wherein $0.1 \leq X$ and $Y \leq 0.1$, with preference given to $LiCoO_2$, $LiMn_{(1-X)}Co_X O_2$, $LiMn_{(1-X-Y)}Al_X Co_Y O_2$, $LiCo_{(1-X)}Ni_X O_2$, $LiCo_{(1-X)}Mn_X O_2$ and the like, particularly preferably $LiCoO_2$.

The Li-transition metal composite oxide needs to satisfy the above-mentioned formula (1) because, when [20/(specific surface area×average particle size)] is less than 7 or greater than 9, the resistance increases in the positive electrode active material itself, thereby degrading the charge and discharge cycle characteristic of the secondary battery. It also adversely affects low temperature characteristic and storage characteristic of the lithium ion secondary battery.

The Li-transition metal composite oxide preferably has an average particle size of 10 $\mu m$–25 $\mu m$, particularly preferably 17 $\mu m$–23 $\mu m$. When the average particle size is less than 10 $\mu m$, abnormal cell reaction tends to occur, leading to less safety. When the average particle size exceeds 25 $\mu m$, electric resistance becomes higher, with the propensity to lower the energy density per unit volume of the lithium ion secondary battery.

The Li-transition metal composite oxide preferably has a specific surface area of 0.1 $m^2/g$–0.3 $m^2/g$, particularly preferably 0.15 $m^2/g$–0.25 $m^2/g$. When the specific surface area is less than 0.1 $m^2/g$, the resistance increases and the charge and discharge capacity and rate characteristic tend to be degraded. When it exceeds 0.3 $m^2/g$, oxygen detachment from the active material easily proceeds, thereby possibly impairing the safety.

The average particle size of the Li-transition metal composite oxide is measured by the following method. First, the particles to be the measurement target are cast in an organic liquid such as water, ethanol and the like, and dispersed by ultrasonication at about 35 kHz–40 kHz for about 2 minutes. The particles are in such an amount that makes the laser transmittance (quantity of outgoing light/quantity of incident light) of the dispersion after dispersing treatment 70%–95%. Then, the dispersion is subjected to a microtrack particle size analyzer and the particle size (D1, D2, D3 . . . ) of particles, and the number (N1, N2, N3) of particles having each particle size are measured based on the diffusion of a laser beam.

The microtrack particle size analyzer calculates the particle size distribution of a spherical particle group having a theoretical strength distribution closest to the diffusion strength distribution of the laser beam as measured by a detector. That is, particles are assumed to have a circular section of the same area as the projected image obtained by the irradiation of a laser beam, and the diameter of the sectional circle is taken as the particle size.

The average particle size ($\mu$m) is calculated from the following formula (4) using the particle size (D) of each particle and the number (N) of particles having each particle size, which are obtained above.

average particle size $$(\mu m) = (\Sigma ND^3/\Sigma N)^{1/3} \qquad (4)$$

The Li-transition metal composite oxide has a specific surface area measured by the gas phase adsorption method (single-point method) wherein nitrogen is an adsorbate, from among the adsorption methods described in Material Chemistry of Fine Particles, Yasuo Arai, first edition, 9th impression, Baifukan (Tokyo), pp. 178–184 (1995).

For example, the Li-transition metal composite oxide can be produced by the following methods. One method therefor comprises mixing a starting lithium compound and a desired transition metal compound to make the atomic ratio of the transition metal to lithium 1:1–0.8:1, heating the mixture at a temperature of from 700° C. to 1200° C. in the atmosphere for 3 hours–50 hours to allow reaction, pulverizing the reaction product into particles and harvesting those having an average particle size of not less than 10 $\mu$m, that satisfy the above-mentioned formulas.

A different method further includes heating the above-mentioned pulverized particles at, for example, about 400° C.–750° C., particularly about 450° C.–700° C., for about 0.5 hour–50 hours, particularly about 1 hour–20 hours. The particles preferably have an average particle size of 10 $\mu$m–25 $\mu$m. When the particles are thus heat treated, only the specific surface area can be reduced without changing the average size of the particles. As a result, a Li-transition metal composite oxide that satisfies the above-mentioned formulas can be easily obtained.

The pulverized particles are heat treated in any atmosphere, which may be in the air or under an inert gas (e.g., nitrogen, argon) atmosphere. When carbonic acid gas is present in the atmosphere, however, lithium carbonate is generated and the content of the impurity may increase. Thus, the heat treatment is preferably conducted in an atmosphere having a carbonic acid gas partial pressure of not more than about 10 mmHg.

The above-mentioned starting lithium compound is exemplified by lithium oxide, lithium hydroxide, lithium halide, lithium nitrate, lithium oxalate, lithium carbonate and mixtures thereof. Examples of the transition metal compound include oxide of transition metal, hydroxide of transition metal, halide of transition metal, nitrate of transition metal, oxalate of transition metal, carbonate of transition metal, and mixtures thereof. When the desired composite oxide contains the substituted element of (Me) in the aforementioned formulas (2) and (3), a necessary amount of a compound of the substituted element of (Me) is added to a mixture of a lithium compound and a transition metal compound.

A composition (positive electrode active material composition) containing the Li-transition metal composite oxide as a positive electrode active material, a conductive material and a binder is obtained and this composition is generally formed into a layer to give a positive electrode active material layer. Examples of the binder include polytetrafluoroethylene, polyvinylidene fluoride, polyethylene, ethylene-propylene-diene type polymer and the like. The conductive material may be natural or artificial graphite such as fibrous graphite, scaly graphite, spherical graphite, conductive carbon black and the like. The amount of the binder used is about 1–10 parts by weight, preferably 2–5 parts by weight, per 100 parts by weight of Li-transition metal composite oxide. The amount of the conductive material used is about 3–15 parts by weight, preferably 4–10 parts by weight, per 100 parts by weight of Li-transition metal composite oxide. The positive electrode active material layer is generally bonded (adhered) to a current collector to form a positive electrode. The positive electrode current collector to be used with the positive electrode active material layer is preferably a foil or perforated foil of a conductive metal, such as aluminum, aluminum alloy, titanium and the like, which has a thickness of about 10–100 $\mu$m, particularly about 15–50 $\mu$m, an expanded metal having a thickness of about 25–300 $\mu$m, particularly about 30–150 $\mu$m, and the like. The amount of the positive electrode active material composition adhered to one surface of the positive electrode current collector is generally 5–40 mg/cm², preferably 10–30 mg/cm².

When this Li-transition metal composite oxide is used as a positive electrode active material to constitute a lithium ion secondary battery, a negative electrode active material is preferably a graphite such as various natural graphites and artificial graphites (e.g., fibrous graphite, scaly graphite, spherical graphite and the like) or a graphite type carbon material (e.g., graphitized carbon). The negative electrode active material is mixed with a binder into a composition, which is then formed into a negative electrode active material layer. Examples of the binder include those exemplified earlier for the positive electrode active material layer. Where necessary, a conductive material such as carbon black (particularly acetylene black) and the like can be added. The negative electrode active material layer is generally bonded (adhered) to a current collector to form a negative electrode. A negative electrode current collector to be used with the negative electrode active material layer is preferably a foil or perforated foil of a conductive metal such as copper, nickel, silver, SUS and the like, which has a thickness of about 5–100 $\mu$m, particularly about 8–50 $\mu$m, or an expanded metal having a thickness of about 20–300 $\mu$m, particularly about 25–100 $\mu$m. The electrolyte can be obtained by dissolving a salt in an organic solvent. Examples of the salt include $LiClO_4$, $LiBF_4$, $LiPF_6$, $LiAsF_6$, $LiAlCl_4$, $Li(CF_3SO_2)_2N$ and the like. A mixture of one or more kinds a thereof is used. Examples of the above-mentioned organic solvent include ethylene carbonate, propylene carbonate, dimethyl carbonate, diethyl carbonate, ethylmethyl carbonate, dimethylsulfoxide, sulfolane, $\gamma$-butyrolactone, 1,2-dimethoxyethane, N,N-dimethylformamide, tetrahydrofuran, 1,3-dioxolane, 2-methyltetrahydrofuran, diethyl ether and the like. A mixture of one or more kinds thereof is used. The concentration of the above-mentioned salt in the electrolyte is about 0.1–3 mol/L.

The positive electrode active material composition of the present invention contains at least a Li-transition metal composite oxide having an average particle size of not less than 10 $\mu$m as a positive electrode active material, conductive material particles having a particle size of not less than 3 $\mu$m (greater size) and conductive material particles having a particle size of not more than 2 $\mu$m (smaller size) (a first embodiment); or contains a Li-transition metal composite oxide having an average particle size of not less than 10 $\mu$m as a positive electrode active material, conductive material particles having a particle size of not less than 3 $\mu$m (greater size) and a conductive material fiber having an aspect ratio of 3 or above and having a fiber diameter of not more than 2 $\mu$m (smaller size) (a second embodiment). The second lithium ion secondary battery of the present invention contains either of these positive electrode active material compositions.

The positive electrode active material in this composition, i.e., Li-transition metal composite oxide, is preferably shown by the aforementioned formulas (3) and (4). Particularly preferably, $LiCoO_2$ or $Li_ACo_{1-X}Me_XO_2$ (wherein A, X and element Me are as mentioned above).

A positive electrode active material having a relatively large particle size-makes the secondary battery safer. The concurrent use of particles having a greater size and particles having a smaller size as a conductive material has a consequence that the conductive material having a smaller size gathers mainly on the surface of the positive electrode active material to make the surface thereof conductive, while the conductive material having a greater size gets interposed between the positive electrode active material particles having a conductive surface to electrically connect them. In result, the electrical connection between particles becomes fine despite the fact that the positive electrode active material consists of relatively large particles, and a highly conductive positive electrode active material layer can be formed. This in turn significantly improves the discharge voltage and discharge capacity during the charge and discharge cycles of the secondary battery.

When the conductive material having a smaller size (particulate conductive material having a particle size of not more than 2 μm or fibrous conductive material having an aspect ratio of 3 or above and having a fiber diameter of not more than 2 μm) alone is used, the conductive material mainly gathers on the surface of the positive electrode active material particle. Therefore, the conductivity of the surface of the positive electrode active material is improved. However, the amount of the conductive material present in between adjacent positive electrode active material particles decreases to the extent that an electrical connection failure occurs. As a result, a greater loss of energy due to self exothermic reaction, voltage fall and the like are caused. On the other hand, when a conductive material having a greater size (conductive material having a particle size of about or above 10 μm) alone is used, the conductive material mainly stays between positive electrode active material particles, making smaller the amount of the conductive material present on the surface of the positive electrode active material particles. As a result, the conductivity of the surface of the positive electrode active material particle becomes insufficient. This in turn causes a greater loss of energy due to self exothermic reaction, voltage drop and the like, because a chain of conductive material formed between the particles of the positive electrode active material lacks sufficient electrical connection to the positive electrode active material particles.

The positive electrode active material composition affords both the safety and improved charge and discharge cycle characteristic of the lithium secondary battery. For this end, the Li-transition metal composite oxide (positive electrode active material) has an average particle size of not less than 10 μm. When the average particle size is too large, the Li-transition metal composite oxide itself has greater electrical resistance and the electrical resistance of the positive electrode active material composition cannot be reduced even by the addition of a conductive carbon material. Thus, the average particle size is preferably 10 μm–30 μm, particularly preferably 10 μm–25 μm. The Li-transition metal composite oxide is measured for the average particle size by the method described earlier. The relationship between the specific surface area and the average particle size, that satisfies the aforementioned formula (1), produces more preferable results.

In the first embodiment of the positive electrode active material composition, a particulate conductive material having a particle size of not less than 3 μm (hereinafter to be referred to as a first conductive material) and a particulate conductive material having a particle size of not more than 2 μm (hereinafter to be referred to as a second conductive material) are used, and in the second embodiment, the aforementioned first conductive material and a fibrous conductive material having an aspect ratio (fiber length/fiber diameter) of 3 or above and having a small size of fiber diameter of not more than 2 μm are used (hereinafter to be referred to as a third conductive material). As used herein, by being particulate is meant, but not particularly limited to, being scaly, spherical, pseudo-spherical, bulky, whisker and the like.

As the first conductive material, a carbon material can be used, like the conventional conductive materials. For example, artificial or natural graphites, and carbon black such as acetylene black, oil furnace black, extra conductive furnace black and the like can be used. Of these carbon materials, graphites, particularly graphitized carbon having a spacing of lattice planes (D002) of not more than 0.34 nm and a crystallite size in the c-axis direction (Lc) of not less than 10 nm is preferably used for an improved cycle characteristic.

The above-mentioned spacing of lattice planes (d002) and the crystallite size in the c-axis direction (Lc) can be measured according to Japan Society for the Promotion of Science Method, which is explained in the following.

Highly pure silicon for X ray standard substance is pulverized in an agate mortar to a size of not more than 325 mesh standard sieve to give a standard substance. This standard substance and a specimen to be measured (graphitized carbon) are mixed in an agate mortar (graphitized carbon: 100 wt %, standard substance: 10 wt %) to give a specimen for X ray. This specimen for X ray is uniformly filled in a sample board of an X ray diffraction apparatus (RINT2000 manufactured by RIGAKU ELECTRIC CORPORATION, X ray source: CuKα ray). The 002 peak of carbon and 111 peak of standard substance are measured under the conditions of voltage applied to X ray tube 40 kV, applied current 50 mA, scanning range 2θ=23.5°–29.5°, scanning speed 0.25 degree/min. Using a graphitized degree calculation soft equipped with the above-mentioned X ray diffraction apparatus, the spacing of lattice planes (d002) and crystallite size in the c-axis direction (Lc) are calculated from the obtained positions of the peaks and half-width thereof.

The first conductive material is used to improve the electrical connection between the positive electrode active material particles, and should have a certain size to achieve the intended electrical connection. Too great a size prevents the closest packing of the positive electrode active material. Therefore, the use of the particles having a particle size of 5 μm–25 μm is preferable. In addition, the use of the particles having a specific surface area of not more than 20 $m^2/g$, particularly 1 $m^2/g$–10 $m^2/g$, is preferable.

The particle size of the first conductive material means the diameter of the sectional circle, assuming the particles constituting the first conductive material to be spherical, and is measured using a microtrack particle size analyzer as in the case of the aforementioned Li-transition metal composite oxide.

As the second conductive material, like the first conductive material, artificial or natural graphites, and carbon black such as acetylene black, oil furnace black, extraconductive furnace black and the like can be used.

The second conductive material is used to make the surface of the positive electrode active material particles conductive, and too great a size thereof prevents such effect.

Therefore, the use of the particles having a particle size of not more than 1 μm is particularly preferable. In addition, the use of the particles having a specific surface area of not less than 10 m$^2$/g, particularly not less than 15 m$^2$/g, is preferable.

The particle size of the second conductive material means the diameter of the sectional circle, assuming the particles constituting the second conductive material to be spherical, and is measured using a microtrack particle size analyzer. When the particle size is less than 1 μm, particles tend to aggregate in a dispersion. When the particle size is less than 1 μm, an electron microscope is preferably used. Specifically, the magnification is set to a value that contains at least 20 particles in the view and an electron microscopic photograph is taken. Then, the area of the image of each particle on the photograph is calculated. From this calculated area, the diameter of the circle having the same area is calculated. The particles constituting the second conductive material are assumed to be spheres having the sectional circle of this diameter, and the diameter is taken as the particle size of the second conductive material.

The specific surface areas of the first conductive material and the second conductive material are measured in the same manner as in the measurement of the specific surface area of the aforementioned Li-transition metal composite oxide, and by a gas phase adsorption method (single-point method) using nitrogen as an adsorbate.

As the third conductive material, various carbon fibers can be used. Specifically, carbon fibers prepared by vapor phase growth and the like, graphitized carbon fibers such as mesophase type graphitized carbon, and the like can be used. The carbon fiber may be linear or curled.

The third conductive material, like the second conductive material, is used to make the surface of the positive electrode active material particles conductive, and too great a size thereof prevents such effect. Therefore, the use of the particles having an aspect ratio (fiber length/fiber diameter) of 10–50 is preferable. In addition, the use of the particles having a fiber diameter of not more than 1 μm is preferable.

The aspect ratio and the fiber diameter of the third conductive material are measured using an electron microscope, like the second conductive material having a particle size of not more than 1 μm. Specifically, the magnification is set to a value that contains at least 20 fibers in the view and an electron microscopic photograph is taken. The fiber diameter and fiber length of each fiber on the photograph are measured with a caliper. The fiber length is the shortest distance between one end to the other end of a fiber when it is linear. When the fiber is curled, the fiber length is the distance between two optional and most distant points on the fiber.

When the ratio of the amounts used of the first conductive material and the second conductive material or third conductive material is too out of balance (either too great or too small), the effect of concurrent use of the aforementioned conductive material having a greater size and the conductive material having a smaller size tends to decrease. The amounts used of the second conductive material or third conductive material is preferably 1 part by weight–200 parts by weight per 100 parts by weight of the first conductive material. For more improved conductivity and safety to be achieved, it is preferably 5 parts by weight–100 parts by weight, particularly preferably 10 parts by weight–50 parts by weight.

The total amount used of the conductive material is, for example, about 3 parts by weight–15 parts by weight per 100 parts by weight of Li-transition metal composite oxide. Due to the use of two kinds of conductive materials having different sizes in the present invention, an amount thereof less than conventional, for example 3 parts by weight–10 parts by weight per 100 parts by weight of Li-transition metal composite oxide, can provide a-sufficient conductivity imparting effect. Therefore, the amount of the Li-transition metal composite oxide can be increased, as a result of which the battery capacity can be increased.

The binder of the positive electrode active material composition may be polytetrafluoroethylene, polyvinylidene fluoride, polyethylene, ethylene-propylene-diene type polymer and the like. The binder is used in an amount of 1 part by weight–20 parts by weight, preferably 1 part by weight–10 parts by weight, per 100 parts by weight of the positive electrode active material composition.

Other constituent materials of a battery, such as a positive electrode current collector that constitutes the positive electrode together with the positive electrode active material composition, a negative electrode active material, a negative electrode current collector, an electrolyte (organic solvent constituting the electrolyte) and the like are preferably those exemplified for the aforementioned invention (Li-transition metal composite oxide having a specific relationship between particle size and specific surface area). The amount of the positive electrode active material composition adhered to one surface of the positive electrode current collector is generally 5–40 mg/cm$^2$, preferably 10–30 mg/cm$^2$.

The third lithium ion secondary battery of the present invention comprises, as a negative electrode active material, graphitized carbon having a specific surface area of not more than 2.0 m$^2$/g, a spacing of lattice planes (d002) of not more than 0.3380 nm, and a crystallite size in the c-axis direction (Lc) of not less than 30 nm, and a mixed solvent of ethylene carbonate, propylene carbonate, dimethyl carbonate, and at least one kind selected from diethyl carbonate and ethylmethyl carbonate, as a solvent for an electrolyte.

The graphitized carbon preferably has a specific surface area of 0.7 m$^2$/g–1.5 m$^2$/g, a spacing of lattice planes (d002) of 0.3350 nm–0.3370 nm, and a crystallite size in the c-axis direction (Lc) of 40 nm–80 nm.

The combination of the specific negative electrode active material and the electrolyte provides a superior discharge cycle characteristic even though the mixed solvent for the electrolyte contains EMC, DMC and PC, which is free of the decomposition of the mixed solvent as reported in JP-A-7-14607. When the graphitized carbon has a specific surface area that is greater than 2.0 m$^2$/g, PC tends to decompose during charging to degrade the battery capacity. When the spacing of lattice planes (d002) is greater than 0.3380 nm or when the crystallite size in the c-axis direction (Lc) is less than 30 nm, the reversibility of intercalation reaction of lithium in the negative electrode active material becomes insufficient. As a result, the battery shows degraded charge and discharge cycle characteristic.

The graphitized carbon is used in a powder state, like a typical graphite type negative electrode active material. The particles constituting the graphitized carbon are not particularly limited in shape, and they can be scaly, fibrous, spherical, pseudo-spherical, bulky, whisker and the like. However, from the aspects of easiness of coating a negative electrode current collector with a negative electrode active material composition and orientation of graphitized carbon after coating, the graphitized carbon is preferably fibrous. Thus, a fibrous mesophase type graphitized carbon, namely, mesophase type graphitized carbon fiber, is particularly preferably used. A mesophase type graphitized carbon fiber can be produced by, for example, the following method.

First, a pitch such as petroleum pitch, coal tar pitch and the like, particularly, mesophase pitch containing mesophase in a proportion of not less than 70% by volume is spun into a fiber having a length of about 200 μm–300 μm by a melt blow method. This fiber is carbonized at 800° C.–1500° C., and pulverized into a fiber having a suitable size such as an average fiber length of about 1 sum–100 μm and an average fiber diameter of about 1 μm–15 μm. The pulverized fiber is heated at 2500° C.–3200° C., preferably 2800° C.–3200° C., for graphitization to give a mesophase type graphitized carbon fiber. For fine coatability of the negative electrode active material composition to be mentioned later to the negative electrode current collector, the above-mentioned pulverization is preferably performed to make the average fiber length 1 μm–100 μm, particularly 3 μm–50 μm, further 2–25 μm, and the average fiber diameter 0.5 μm–15 μm, particularly 1 μm–15 μm, further 5 μm–10 μm. The aspect ratio (average fiber length/average fiber diameter ratio) is preferably 1–5.

The specific surface area of the graphitized carbon is measured by the same method as in the aforementioned measurement of the specific surface area of Li—Co type composite oxide [gas phase adsorption method (single-point method) wherein nitrogen is an adsorbate]. The spacing of lattice planes (d002) of graphitized carbon is measured according to the aforementioned Japan Society for the Promotion of Science Method.

The mixed solvent for the electrolyte has an optional mixing ratio. However, at least one member selected from ethyl carbonate and ethylmethyl carbonate is preferably contained in a proportion of 25% by volume–50% by volume (particularly preferably 30% by volume–35% by volume), ethylene carbonate is preferably contained in a proportion of 4% by volume–20% by volume. (particularly preferably 6% by volume–18% by volume), propylene carbonate is preferably contained in a proportion of 3% by volume–17% by volume (particularly preferably 5% by volume–15% by volume), and dimethyl carbonate is preferably contained in a proportion of beyond 40% by volume and not more than 60% by volume (particularly preferably 45% by volume–55% by volume).

When the content of ethylene carbonate is less than 4% by volume, a stable film may not be formed on the surface of the negative electrode. When it exceeds 20% by volume, the viscosity of the electrolyte increases, which in turn raises resistance in the battery, degrading the charge and discharge cycle characteristic. When the content of propylene carbonate is less than 3% by volume, increase of impedance associated with the charge and discharge cycles may be suppressed to a smaller extent, and when it exceeds 17% by volume, the viscosity of the electrolyte increases, which in turn raises resistance in the battery, degrading the charge and discharge cycle characteristic. When the content of dimethyl carbonate is not more than 40% by volume, the viscosity of the electrolyte increases, which in turn raises the resistance in the battery, degrading the charge and discharge cycle characteristic. When it exceeds 60% by volume, the freezing point of the electrolyte raises to increase the resistance in the battery at low temperature, degrading the charge and discharge cycle characteristic at low temperature. When the content of ethyl carbonate and/or ethylmethyl carbonate is less than 25% by volume, the freezing point of the electrolyte increases and the resistance in the battery at low temperature increases, degrading the charge and discharge cycle characteristic at low temperature. When it exceeds 50% by volume, the viscosity of the electrolyte raises to increase the resistance in the battery, degrading the charge and discharge cycle characteristic.

A negative electrode active material is mixed with a binder to form a composition, which is then formed into a negative electrode active material layer. Examples of the binder include polytetrafluoroethylene, polyvinylidene fluoride, polyethylene, ethylene-propylene-diene type polymer and the like. Where necessary, a conductive material, such as carbon black and the like, can be added. The negative electrode active material is used in an amount of 80–96 parts by weight, preferably 90–95 parts by weight, per 100 parts by weight of the total amount of the negative electrode active material and the binder. The negative electrode current collector is preferably a foil or perforated foil of a conductive metal, such as copper, nickel, silver, SUS and the like, which has a thickness of about 5–100 μm, particularly about 8–50 μm, an expanded metal having a thickness of about 20–300 μm, particularly about 25–100 μm, and the like. The amount of the negative electrode active material composition adhered to one surface of the negative electrode current collector is generally 3–20 $mg/cm^2$, preferably 5–15 $mg/cm^2$.

The electrolyte contains the above-mentioned mixed solvent and one or more from Li salts such as $LiClO_4$, $LiBF_4$, $LiPF_6$, $LiAsF_6$, $LiAlCl_4$ $Li(CF_3SO_2)_2N$ and the like dissolved therein. The Li salt concentration of the electrolyte is generally about 0.1 mol/L–2 mol/L, which is preferably about 0.5 mol/L . 1.8 mol/L, particularly preferably about 0.8 mol/L–1.5 mol/L, from the aspect of charge and discharge cycle characteristic.

The positive electrode active material consists of Li-transition metal composite oxide. This composite oxide preferably has the composition shown by the aforementioned formulas (3) and (4), particularly preferably $LiCoO_2$ and $Li_A Co_{1-x} Me_x O_2$ (wherein A, X and element Me are as defined above). The average particle size thereof is preferably not less than 10 μm. The binder, conductive material and positive electrode current collector of the positive electrode active material layer are preferably those referred to for the aforementioned Li-transition metal composite oxide.

The fourth lithium ion secondary battery of the present invention is a combination of the aforementioned Li-transition metal composite oxide, a positive electrode active material composition and the third lithium ion secondary battery. To be specific, the following are comprised.

Positive electrode active material: particulate Li-transition metal composite oxide having an average particle size of not less than 10 μm, [20/(average particle size×specific surface area)]=7–9.

Conductive material: a mixture of particulate conductive material having a particle size of not less than 3 μm and a particulate conductive material having a particle size of not more than 2 μm, or a mixture of a particulate conductive material having a particle size of not less than 3 μm and a fibrous conductive material having an aspect ratio of 3 or above and having a fiber diameter of not more than 2 μm.

Negative electrode active material: graphitized carbon having a specific surface area of not more than 2.0 $m^2/g$, a spacing of lattice planes of not more than 0.3380 nm, and a crystallite size in the c-axis direction of not less than 30 nm.

Solvent for electrolyte: a mixed solvent of at least one kind selected from diethyl carbonate and ethylmethyl carbonate, ethylene carbonate, propylene carbonate and dimethyl carbonate.

Each of these constituent materials [Li-transition metal composite oxide (positive electrode active material), positive electrode active material composition, negative electrode active material and electrolyte] is as mentioned above. Other constituent materials of the battery, such as a positive electrode current collector, a negative electrode active material composition (negative electrode active material layer) and a negative electrode current collector can be the same as those referred to in the foregoing explanations.

The lithium ion secondary battery of this constitution can provide extremely superior properties of a battery due to the synergistic action and effects of the aforementioned three characteristics. That is, improved charge and discharge cycle characteristic prolongs the service life of the battery; improved storage characteristic suppresses degradation of the property due to full charge standing, which has posed a serious problem in the conventional lithium ion secondary batteries; and low temperature characteristic can be improved.

The fifth lithium ion secondary battery of the present invention uses, as the solvent for the electrolyte, at least one kind selected from diethyl carbonate and ethylmethyl carbonate in a proportion of 40% by volume–50% by volume (preferably 42% by volume–48% by volume), ethylene carbonate in a proportion of 4% by volume–10% by volume (preferably 6% by volume–9% by volume), propylene carbonate in a proportion of 10% by volume–17% by volume (preferably 11% by volume–14% by volume) and dimethyl carbonate in a proportion of 30% by volume–40% by volume (preferably 32% by volume–38% by volume). The electrolyte therefore has low viscosity and does not freeze at low temperature.

When at least one member selected from diethyl carbonate and ethylmethyl carbonate is contained in a proportion of less than 40% by volume, the electrolyte freezes at low temperature and lithium ion cannot move, thereby failing to improve low temperature characteristic. When it exceeds 50% by volume, the electrolyte has a high viscosity, as a result of which the ion conductivity becomes lower, again failing to improve low temperature characteristic. When the mixing ratio of ethylene carbonate is less than 4% by volume, lithium salt is not sufficiently dissociated, and the ion conductivity becomes low, failing to improve low temperature characteristic. When it exceeds 10% by volume, the electrolyte has a high viscosity, as a result of which the ion conductivity becomes lower, again failing to improve low temperature characteristic. When the propylene carbonate content is less than 10% by volume, lithium salt is not sufficiently dissociated, and the ion conductivity becomes low, failing to improve low temperature characteristic. When it exceeds 17% by volume, the electrolyte has a high viscosity, as a result of which the ion conductivity becomes lower, again failing to improve low temperature characteristic. When the dimethyl carbonate content is less than 30% by volume, the electrolyte has a high viscosity, as a result of which the ion conductivity becomes lower, thus failing to improve low temperature characteristic. When it exceeds 40% by volume, the electrolyte freezes at low temperature and lithium ion cannot move, thereby failing to improve low temperature characteristic.

The lithium salt to be dissolved in the electrolyte may be, for example, $LiClO_4$, $LiBF_4$, $LiPF_6$, $LiAsF_6$, $LiAlCl_4$, $Li(CF_3SO_2)_2N$ and the like. One kind alone therefrom may be used or two or more kinds therefrom may be used. Of these, $LiPF_6$ is preferably used in view of greater dissociation constant, high heat stability and less toxicity.

The lithium salt to be dissolved in the electrolyte may be increased in amount because it increases the critical current density at normal temperature or above. At low temperature, however, dissociation of salt is limited. An increase in the amount of lithium salt does not result in an increase in the amount of lithium salt effective for carrying charge. Conversely, it increases the viscosity of electrolyte, lowers the diffusion speed of lithium ion, and consequently degrades the low temperature characteristic. Therefore, the electrolyte is preferably adjusted to have a lithium salt concentration of 0.5 mol/L–1.5 mol/L, preferably 0.7 mol/L–1.2 mol/L.

Like a typical lithium ion secondary battery, the positive electrode and the negative electrode of this lithium ion secondary battery are prepared by forming an active. material layer on a current collector. The active material layers of the positive electrode active material layer and the negative electrode active material layer are preferably formed by mixing a conductive material, a binder and the like with the aforementioned positive electrode active material or negative electrode active material. In the present invention, each active material layer has a filling rate of 65%–85%, preferably 65%–75%. When the filling rate of the active material layer is less than 65%, battery capacity cannot be secured. When it exceeds 85%, the gap between the particles of the active material becomes smaller and the low temperature characteristic cannot be improved to a sufficient degree.

The filling rate of the positive and negative electrode active material layers is obtained by dividing the density (inclusive of gap between particles) of the active material layer formed on the current collector by the density (exclusive of gap between particles) obtained from the solid components alone constituting the active material layer.

The negative electrode active material may be that conventionally used for lithium ion secondary battery. Preferred is graphitized carbon because it can improve discharge capacity and cycle characteristic, and has higher heat stability. Particularly, graphitized carbon having a specific surface area of not more than 2.0 $m^2/g$ (preferably 0.5 $m^2/g$–1.5 $m^2/g$), a spacing of lattice planes (d002) of not more than 0.3380 nm (preferably 0.3355 nm–0.3370 nm) and a crystallite size in the c-axis direction (Lc) of not less than 30 nm (preferably 40 nm–70 nm) is used. Examples of such graphitized carbon include mesophase type graphitized carbon. In a preferred embodiment, the negative electrode active material of the aforementioned third lithium ion secondary battery is used. This has a consequence that decomposition reaction of propylene carbonate during charging can be sufficiently inhibited and the battery capacity is stabilized. In addition, an increase in the voltage of the negative electrode can be sufficiently inhibited and the average discharge potential of the battery can be stabilized. The negative electrode active material particles are not particularly limited in shape and may be scaly, fibrous, spherical, pseudo-spherical, bulky, whisker and the like. When the negative electrode active material is a graphitized carbon, the particles are preferably fibrous from the aspects of easiness of coating a negative electrode current collector and orientation of particles, which orientation can be beneficial for the absorption and release of lithium. Therefore, the most preferable graphitized carbon is fibrous mesophase type graphitized carbon, i.e., mesophase type graphitized carbon fiber. The production method of the mesophase type graphitized carbon fiber is as mentioned above. For the negative electrode active material layer to satisfy the above-mentioned specific filling rate, the carbonized fiber is pulverized to make the average fiber length 1 μm–100 μm, particularly 3 μm–50 μm, more preferably 2–25 μm, and the average fiber diameter 0.5 μm–15 μm, particularly 1 μm–15 μm, more preferably 5 μm–10 μm. The aspect ratio (average fiber length/average fiber diameter ratio) is preferably 1–5. The specific surface area, the spacing of lattice planes and the crystallite size in the c-axis direction of the above-mentioned graphitized carbon are measured by the same methods as described earlier.

The binder to be used for forming the negative electrode active material layer of the lithium ion secondary battery is the same as those mentioned above. The amount of the binder is 4 parts by weight–20 parts by weight, preferably 5 parts by weight–10 parts by weight, per 100 parts by weight of the active material. While a conductive material is not particularly necessary for the negative electrode active material layer, carbon black (particularly acetylene black) and the like can be added where necessary. When a conductive material is to be used, its amount is 0.1 part by weight–10 parts by weight, preferably 0.5 part by weight–5 parts by weight, per 100 parts by weight of the active material. The negative electrode current collector is preferably a foil or perforated foil of a conductive metal, such as copper, nickel, silver, SUS and the like, which has a thickness of about 5–100 μm, particularly about 8–50 μm, an expanded metal having a thickness of about 20–300 μm, particularly about 25–100 μm, and the like. The amount of the negative electrode active material composition adhered to one surface of the negative electrode current collector is generally 3–20 mg/cm$^2$, preferably 5–15 mg/cm$^2$.

The positive electrode active material consists of Li-transition metal composite oxide. This composite oxide preferably has the composition shown by the aforementioned formulas (3) and (4), particularly preferably LiCoO$_2$ and Li$_A$Co$_{1-x}$Me$_x$O$_2$ (wherein A, X and element Me are as defined above). The average particle size thereof is preferably not less than 10 μm. The product of the specific surface area and the average particle size of the particles preferably satisfies the aforementioned formula (1) to meet the filling rate of the aforementioned positive electrode active material layer. The binder, conductive material and positive electrode current collector of the positive electrode active material layer are preferably those referred to for the aforementioned Li-transition metal composite oxide. The amount of the binder is 2 parts by weight–8 parts by weight, preferably 3 parts by weight–5 parts by weight, relative to the active material (100 parts by weight). The amount of the conductive agent is 4 parts by weight–10 parts by weight, preferably 6 parts by weight–8 parts by weight, per 100 parts by weight of the active material.

The sixth lithium ion secondary battery of the present invention is a combination of the aforementioned Li-transition metal composite oxide and the aforementioned positive electrode active material composition, comprising the following.

Positive electrode active material: Li-transition metal composite oxide particles having the product of a specific surface area (m$^2$/g) and an average particle size (μm), which satisfies the aforementioned formula (1) and having an average particle size of 10 μm.

Conductive material for positive electrode: a mixture of a particulate conductive material having a particle size of not less than 3 μm and a particulate conductive material having a particle size of not more than 2 μm, or a mixture of a particulate conductive material having a particle size of not less than 3 μm and a fibrous conductive material having an aspect ratio of 3 or above and having a fiber diameter of not more than 2 μm.

These Li-transition metal composite oxide and conductive material for positive electrode are as explained above. Other constituent materials, such as a positive electrode current collector, a negative electrode (negative electrode active material composition, negative electrode current collector) and the like can be those referred to in the above.

Figure 3:
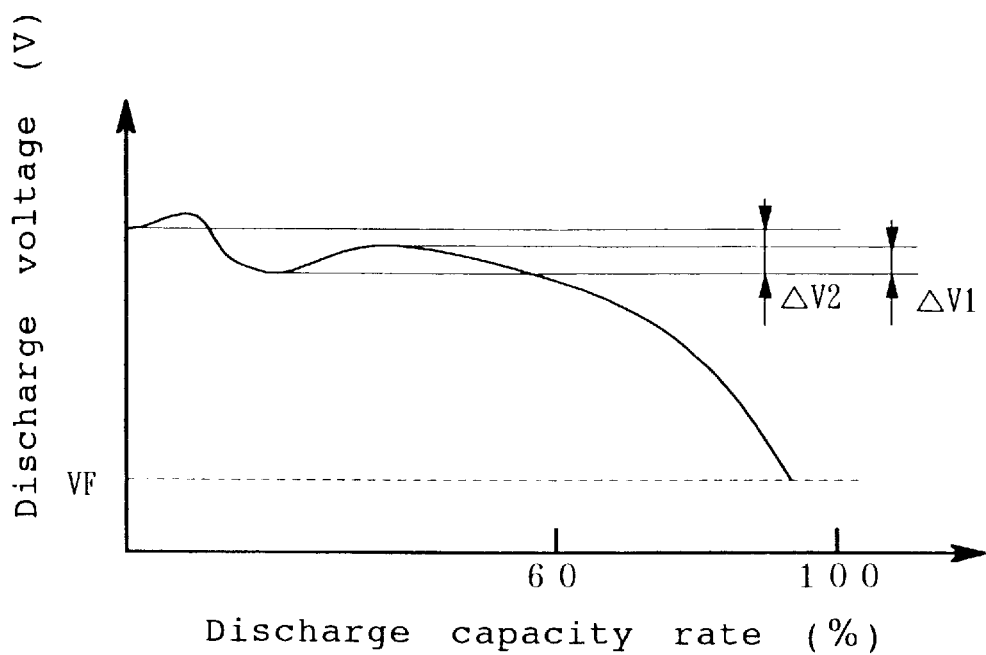
FIG. 3 shows a yet another example of the discharge curve of the lithium ion secondary battery of the present invention.

FIGS. 1–3 show discharge curves of this lithium ion secondary battery, wherein the axis of abscissa shows discharge capacity rate (%) and the axis of ordinate shows discharge voltage (V). Each discharge curve was obtained upon 1 C discharge at −20° C. The discharge capacity rate (%) was calculated relative to the discharge capacity (mAh) upon 1 C discharge at 20° C. as 100% and shows the proportion relative to the discharge capacity. When a cut-off voltage during discharge is set, the discharge capacity rate is calculated relative to the discharge capacity at the time the cut-off voltage is met. In FIG. 1–FIG. 3, VF is the cut-off voltage.

In FIG. 1, the discharge curve is a backslash without the minimum value, wherein a radical drop in voltage at the initial stage of discharge was inhibited. In FIG. 2, the discharge curve contains the minimum value and the maximum value appearing in the discharge capacity rate increasing direction, with the occurrence of a voltage drop at the initial stage of discharge. However, the difference (ΔV1) between the minimum value and the maximum value is not more than 0.1 (V), and the difference (ΔV2) between the minimum value and the discharge voltage, when the discharge capacity rate is 0%, is not more than 0.3 (V). The degree of drop in the voltage is smaller than in conventional cases. In FIG. 3, the discharge curve contains the first maximum value, the minimum value and the second maximum value appearing in the discharge capacity rate increasing direction. Again, the occurrence of a voltage drop at the initial stage of discharge is observed. However, the difference (ΔV1) between the minimum value and the second maximum value is not more than 0.1 (V), and the difference (ΔV2) between the minimum value and the discharge voltage, when the discharge capacity rate is 0%, is not more than 0.3 (V). The degree of the voltage drop is smaller than in conventional cases. As shown in FIG. 1–FIG. 3, discharge capacity (mAh) upon 1 C discharge at −20° C. is not less than 60% of the discharge capacity (mAh) upon 1 C discharge at 20° C. Thus, the degree of drop of discharge capacity is smaller in the extremely low temperature region. The lithium ion secondary battery can inhibit a drastic voltage drop at the initial stage of discharge in the extremely low temperature region. In addition, a decrease in the discharge capacity can be also inhibited.

The electrolyte of the lithium ion secondary battery preferably comprises, as the solvent, a mixed solvent of ethylene carbonate, propylene carbonate, dimethyl carbonate and at least one member selected from diethyl carbonate and ethylmethyl carbonate, particularly preferably has the specific mixing ratio as shown with regard to the aforementioned fifth lithium ion secondary battery.

The lithium salt to be dissolved in the electrolyte is preferably that used for the aforementioned fifth lithium ion secondary battery. That is, the electrolyte is preferably adjusted to have the lithium salt concentration of 0.5 mol/L–1.5 mol/L, preferably 0.7 mol/L–1.2 mol/L.

The lithium ion secondary battery of the present invention can be used as various lithium ion secondary batteries having a shape of a cylinder, a square, a sheet and the like, without particular limitation. The lithium ion secondary battery of the present invention can utilize various constituent members such as battery can, battery lid, safety structure, electrode terminal and the like, which are conventionally available or will be developed in the future.

DESCRIPTION OF THE PREFERRED EMBODIMENTS

The present invention is explained in more detail in the following by referring to examples that do not limit the present invention. In addition, Comparative Examples demonstrate the noticeable effect of the present invention.

Examples 1–4, Comparative Examples 1–5

$Co_3O_4$ and $Li_2CO_3$ in a proportion of 42 parts by weight of $Li_2CO_3$ per 100 parts by weight of $Co_3O_4$ were mixed and the homogeneous mixture was sintered at about 980° C. for about 10 hours. The resulting bulk of $LiCoO_2$ was pulverized, divided and heat treated in the atmosphere to give the $LiCoO_2$ particles of Examples 1–4 and Comparative Examples 1–5 as shown in Table 1. The $LiCoO_2$ particles of Comparative Examples 1–3 were not subjected to the above-mentioned heat treatment.

The heat treatment conditions (temperature and hours), average particle size B after heat treatment, specific surface area A after heat treatment, decrease (ΔA) in specific surface area due to the heat treatment, and (20/(AB)) of the $LiCoO_2$ particles of Examples and Comparative Examples are shown in Table 2. The average particle size B and specific surface area A of the $LiCoO_2$ particles of Comparative Examples 1–3 were obtained using the particles without heat treatment.

TABLE 1

| | Heat treatment | | Average particle size B (μm) | Specific surface area A (m²/g) | ΔA (%) | 20/(AB) | Discharge capacity retention (%) |
| | Temperature (° C.) | Time (hr) | | | | | |
|---|---|---|---|---|---|---|---|
| Ex. 1 | 500 | 12 | 19.7 | 0.136 | 15.0 | 7.46 | 90.6 |
| Ex. 2 | 700 | 12 | 19.9 | 0.116 | 27.5 | 8.66 | 91.2 |
| Ex. 3 | 500 | 12 | 16.4 | 0.157 | 21.5 | 7.76 | 91.5 |
| Ex. 4 | 600 | 12 | 13.0 | 0.214 | 23.6 | 7.19 | 90.4 |
| Com. Ex. 1 | — | — | 12.6 | 0.280 | — | 5.67 | 83.1 |
| Com. Ex. 2 | — | — | 16.2 | 0.200 | — | 6.17 | 81.4 |
| Com. Ex. 3 | — | — | 19.4 | 0.160 | — | 6.44 | 78.3 |
| Com. Ex. 4 | 800 | 12 | 17.6 | 0.115 | 22.5 | 9.88 | 82.6 |
| Com. Ex. 5 | 800 | 12 | 20.9 | 0.096 | 38.0 | 9.97 | 82.3 |

The $LiCoO_2$ particles (90 parts by weight) of Examples 1–4 and Comparative Examples 1–5 were mixed with polyvinylidene fluoride (7 parts by weight) as a binding agent, acetylene black (3 parts by weight) as a conducting agent, and N-methyl-2-pyrrolidone (70 parts by weight) to give slurry. The slurry was applied onto the both surfaces of a 20 μm thick aluminum foil to be a current collector, dried and press stretched to give a positive electrode made of an aluminum foil having a 20 mg/cm² thick positive electrode active material composition layer per one side thereof.

Scaly graphite (90 parts by weight), polyvinylidene fluoride (10 parts by weight) and N-methyl-2-pyrrolidone (200 parts by weight) were mixed to give a slurry. This slurry was applied onto the both surfaces of a 14 μm thick copper foil to be a current collector, dried and press stretched to give a negative electrode made of a copper foil having a 10.4 mg/cm² thick negative electrode active material composition layer per one side thereof.

The positive electrode and the negative electrode were wound via a porous polyethylene separator to give a cylindrical lithium ion secondary battery (discharge capacity: 1500 mAh) having a height of 65 mm and an outer diameter of 18 mm. As the electrolyte, a solution obtained by dissolving 1 mol of $LiPF_6$ in a mixed solvent (1 L) of ethylene carbonate, propylene carbonate and diethyl carbonate (mixing volume ratio 3:2:5) was filled between the above-mentioned positive electrode and the negative electrode.

The lithium ion secondary batteries were evaluated for charge and discharge cycle characteristic according to the following charge and discharge cycles test method and the discharge capacity retention (%) at the 100th cycle is shown in Table 1.

[Charge and Discharge Cycle Test Method]

One cycle consists of 2.5 hr charge under 2.6 mA constant current and 4.2 V constant voltage per 1 cm² of positive electrode, 1 hr rest after charge, discharge till terminal voltage of 3V under 1.3 mA constant current per 1 cm² of positive electrode, and 1 hr rest after discharge. This cycle was repeated 100 times at room temperature (20° C.). The discharge capacity (mA.H) is calculated from discharge current and discharge hours at each cycle. The ratio of discharge capacity at each cycle relative to the initial discharge capacity is taken as discharge capacity retention (%).

From Table 1, it is known that the lithium ion secondary batteries comprising the $LiCoO_2$ particles of Comparative Examples 1–5 having a (20/(AB)) value outside the range of the aforementioned formula (1) as the positive electrode active material showed the discharge capacity retention of not more than 85% at 100th cycle. In contrast, the lithium ion secondary batteries comprising the $LiCoO_2$ particles of Examples 1–4 having a (20/(AB)) value within the range of the aforementioned formula (1) as the positive electrode active material showed high discharge capacity retention of not less than 90% at 100th cycle, demonstrating superior charge and discharge cycle characteristic.

Examples 5–10, Comparative Examples 6–10

In the following Examples 5–10 and Comparative Examples 6–10, the average particle size of the Li-transition metal composite oxide and the particle size of the conductive material having a particle size of not less than 1 μm were measured by SALD3000J manufactured by SHIMADZU CORPORATION. The particle size of the conductive material having a particle size of less than 1 μm and the aspect ratio and fiber diameter of the fibrous conductive material were measured by a scanning type electron microscope (SEM).

Example 5

$LiCoO_2$(90 parts by weight, average particle size 20 μm), spherical artificial graphite (6 parts by weight, particle size 6 μm), oil furnace black (1 part by weight, particle size 40 nm, specific surface area 700 m²/g), and polyvinylidene fluoride (3 parts by weight, binding agent) were homogeneously dispersed in N-methyl-2-pyrrolidone to give a slurry. This slurry was applied onto the both surfaces of a 20 μm thick aluminum foil to be a current collector, dried and press stretched to give a positive electrode made of an aluminum foil having 20 mg/cm² $LiCoO_2$ per one side thereof.

Example 6

$LiCoO_2$ (90 parts by weight, average particle size 20 μm), artificial scaly graphite (5 parts by weight, particle size 10 μm), bulky artificial graphite (2 parts by weight, particle size 1 μm, specific surface area 20 m²/g) and polyvinylidene fluoride (3 parts by weight, binding agent) were homogeneously dispersed in N-methyl-2-pyrrolidone to give a slurry. In the same manner as in Example 5 and using this slurry, a positive electrode having the same structure as in Example 5 was obtained, which was made of a 20 μm thick aluminum foil having 20 mg/cm$^2$ LiCoO$_2$ per one side thereof.

Example 7

LiCoO$_2$ (90 parts by weight, average particle size 15 μm), artificial scaly graphite (6 parts by weight, particle size 10 μm), carbon fiber (1 part by weight, fiber diameter 0.3 μm, aspect ratio 20) produced by the vapor phase growth method and polyvinylidene fluoride (3 parts by weight, binding agent) were homogeneously dispersed in N-methyl-2-pyrrolidone to give a slurry. In the same manner as in Example 5 and using this slurry, a positive electrode having the same structure as in Example 5 was obtained, which was made of a 20 μm thick aluminum foil having 20 mg/cm$^2$ LiCoO$_2$ per one side thereof.

Example 8

In the same manner as in Example 5 except that LiCoO$_2$ having an average particle size of 15 μm was used instead of LiCoO$_2$ having an average particle size of 20 μm, a positive electrode having the same structure as in Example 5 was obtained, which was made of a 20 μm thick aluminum foil having 20 mg/cm$^2$ LiCoO$_2$ per one side thereof.

Example 9

In the same manner as in Example 5 except that artificial scaly graphite (particle size 10 μm) was used instead of artificial spherical graphite (particle size 6 μm), a positive electrode having the same structure as in Example 5 was obtained, which was made of a 20 μm thick aluminum foil having 20 mg/cm$^2$ LiCoO$_2$ per one side thereof.

Example 10

In the same manner as in Example 5 except that the artificial spherical graphite was used in an amount of 4.5 parts by weight and oil furnace black was used in an amount of 2.5 parts by weight, a positive electrode having the same structure as in Example 5 was obtained, which was made of a 20 μm thick aluminum foil having 20 mg/cm$^2$ LiCoO$_2$ per one side thereof.

Comparative Example 6

LiCoO$_2$ (94 parts by weight, average particle size 20 μm), oil furnace black (3 parts by weight, particle size 40 nm, specific surface area 700 m$^2$/g) and polyvinylidene fluoride (3 parts by weight, binding agent) were homogeneously dispersed in N-methyl-2-pyrrolidone to give a slurry. In the same manner as in Example 5 and using this slurry, a positive electrode made of a 20 μm thick aluminum foil having 20 mg/cm$^2$ LiCoO$_2$ per one side thereof was obtained.

Comparative Example 7

LiCoO$_2$ (90 parts by weight, average particle size 20 μm), artificial scaly graphite (7 parts by weight, particle size 10 μm) and polyvinylidene fluoride (3 parts by weight, binding agent) were homogeneously dispersed in N-methyl-2-pyrrolidone to give a slurry. In the same manner as in Example 5 and using this slurry, a positive electrode made of a 20 μm thick aluminum foil having 20 mg/cm$^2$ LiCoO$_2$ per one side thereof was obtained.

Comparative Example 8

In the same manner as in Example 5 except that LiCoO$_2$ having an average particle size of 5 μm was used instead of LiCoO$_2$ having an average particle size of 20 μm, a positive electrode made of a 20 μm thick aluminum foil having 20 mg/cm$^2$ LiCoO$_2$ per one side thereof was obtained.

Comparative Example 9

LiCoO$_2$ (90 parts by weight, average particle size 5 μm), artificial scaly graphite (7 parts by weight, particle size 5 μm) and polyvinylidene fluoride (3 parts by weight, binding agent) were homogeneously dispersed in N-methyl-2-pyrrolidone to give a slurry. In the same manner as in Example 5 and using this slurry, a positive electrode made of a 20 μm thick aluminum foil having 20 mg/cm$^2$ LiCoO$_2$ per one side thereof was obtained.

Comparative Example 10

LiCoO$_2$ (90 parts by weight, average particle size 20 μm), artificial scaly graphite (6 parts by weight, particle size 10 μm), graphitized carbon fiber (1 part by weight, fiber diameter 5 μm, aspect ratio 2–3) and polyvinylidene fluoride (3 parts by weight, binding agent) were homogeneously dispersed in N-methyl-2-pyrrolidone to give a slurry. In the same manner as in Example 5 and using this slurry, a positive electrode made of a 20 μm thick aluminum foil having 20 mg/cm$^2$ LiCoO$_2$ per one side thereof was obtained.

The positive electrodes obtained in Examples 5–10 and Comparative Examples 6–10 were wound with a porous separator made from polypropylene and polyethylene and a negative electrode comprising graphitized carbon fiber as a negative electrode active material, and placed in cylindrical cans having a height of 65 mm and an outer diameter of 18 mm, whereby lithium ion secondary batteries (discharge capacity: 1500 mAh) were obtained. As the electrolyte, a solution obtained by dissolving LiPF$_6$ in a mixed solvent of ethylene carbonate, propylene carbonate and diethyl carbonate (mixing volume ratio 3:2:5) at a concentration of 1 mol/L was used.

The lithium ion secondary batteries were subjected to a charge and discharge cycle test, a high rate discharge test, and a nail penetrate test according to the following test methods. The results are shown in Tables 2 and 3.

[Charge and Discharge Cycles Test Method]

(i) The batteries were charged with 1.5 A for 2 hours until the voltage became 4.2 V, (ii) discharged with 1.5 A until the voltage between terminals became 3 V, and (iii) put to rest for 1 hour after discharge, the three steps constituting one cycle. These three steps were repeated 100 cycles at room temperature (20° C.), and discharge capacity (mAh) at each cycle and average discharge voltage at each cycle were measured. The ratio of the discharge capacity at each cycle to the initial discharge capacity is taken as the discharge capacity retention (%). The discharge capacity at the initial cycle and 100th cycle, average discharge voltage, and discharge capacity retention (%) are shown in Table 2.

[High Rate Discharge Test Method]

The high rate discharge of the batteries included charge for 2 hours at 1.5 A until the voltage became 4.2 V, discharge at 0.3 A until the voltage between terminals became 3 V, rest for 1 hour after discharge, charge at 1.5 A for 2 hours until the voltage became 4.2 V, and discharge at 3 A until the voltage between terminals became 3 V. The discharge capacity (value a) upon discharge at 0.3 A, discharge capacity (value b) upon discharge at 3 A, and the ratio thereof (b/a) were determined.

Nail Penetrate Test Method

The batteries were charged with 1.5 A until the voltage became 4.3 V, immediately after charging, a nail having an outer diameter of 3 mm was stuck at 4 cm/sec to penetrate the battery at around the center in between the positive electrode terminal and the negative electrode terminal. The presence of ignition of the battery was checked and the number of batteries ignited thereby was counted and is shown in Table 3.

TABLE 2

| | Charge and discharge cycle test | | | | |
|---|---|---|---|---|---|
| | 1st cycle | | 100th cycle | | |
| | Discharge capacity (mAh) | Average discharge voltage (V) | Discharge capacity (mAh) | Average discharge voltage (V) | Discharge capacity retention (%) |
| Ex. 5 | 1500 | 3.74 | 1420 | 3.70 | 95 |
| Ex. 6 | 1500 | 3.72 | 1400 | 3.69 | 93 |
| Ex. 7 | 1500 | 3.71 | 1400 | 3.69 | 93 |
| Ex. 8 | 1500 | 3.75 | 1410 | 3.71 | 94 |
| Ex. 9 | 1500 | 3.73 | 1420 | 3.69 | 95 |
| Ex. 10 | 1500 | 3.74 | 1390 | 3.69 | 93 |
| Com. Ex. 6 | 1500 | 3.65 | 1250 | 3.58 | 83 |
| Com. Ex. 7 | 1500 | 3.62 | 1230 | 3.56 | 82 |
| Com. Ex. 8 | 1500 | 3.73 | 1250 | 3.62 | 83 |
| Com. Ex. 9 | 1500 | 3.62 | 1200 | 3.55 | 80 |
| Com. Ex. 10 | 1500 | 3.62 | 1220 | 3.56 | 81 |

TABLE 3

| | Discharge capacity (mAh) | | | Nail penetrate test |
|---|---|---|---|---|
| | 0.3 A discharge (a) | 3 A discharge (b) | Discharge capacity ratio (b/a) | Number of ignited batteries in 20 batteries (batteries) |
| Ex. 5 | 1550 | 1460 | 94 | 0 |
| Ex. 6 | 1550 | 1440 | 93 | 0 |
| Ex. 7 | 1550 | 1450 | 94 | 0 |
| Ex. 8 | 1550 | 1470 | 95 | 0 |
| Ex. 9 | 1550 | 1450 | 94 | 0 |
| Ex. 10 | 1550 | 1430 | 92 | 10 |
| Com. Ex. 6 | 1560 | 1340 | 86 | 0 |
| Com. Ex. 7 | 1560 | 1330 | 85 | 0 |
| Com. Ex. 8 | 1550 | 1430 | 92 | 20 |
| Com. Ex. 9 | 1570 | 1300 | 83 | 0 |
| Com. Ex. 10 | 1560 | 1320 | 85 | 0 |

As is clear from Tables 2 and 3, the lithium ion secondary batteries of Example 5–Example 10 of the present invention were superior to the lithium ion secondary batteries of Comparative Example 6–Comparative Example 10 in the discharge capacity, average discharge voltage and discharge capacity retention at the 100th cycle in the charge and discharge cycle test, and value b and discharge capacity ratio (b/a) in the high rate discharge test. In addition, they showed superior results in the nail penetrate test, demonstrating higher safety.

In general, high rate discharge is vulnerable to electrode resistance of lithium ion secondary battery, wherein higher electrode resistance reduces discharge capacity. Greater value b and b/a mean smaller electrode resistance. In Table 2, the lithium ion secondary batteries of Example 5–Example 10 of the present invention showed greater values as compared to the batteries of Comparative Example 6–Comparative Example 10. The smaller electrode resistance is clearly the effect of the concurrent use of a conductive material having a greater size and a conductive material having a smaller size.

The lithium ion secondary batteries of Comparative Examples 6, 7, 9 and 10 showed superior results in the nail penetrate test. This was achieved at the sacrifice of charge and discharge cycle characteristic and high rate discharge characteristic. In the lithium ion secondary-battery of Comparative Example 8, the average particle size of $LiCoO_2$ was reduced to 5 μm to improve charge and discharge cycle characteristic of the battery. Consequently, it did poorly in the nail penetrate test.

Examples 11–25, Comparative Examples 11–20

The negative electrodes, positive electrodes, and mixed solvents for the electrolyte necessary for producing the lithium ion secondary batteries of Examples and Comparative Examples were prepared as in the following.

[Preparation of Positive Electrode]

As the positive electrode active materials, the following (A-1, A-2) were prepared.

(A-1) $LiCoO_2$ having an average particle size of 17.8 μm (measured with SALD-3000J manufactured by SHIMADZU CORPORATION, hereinafter the same), a specific surface area of 0.160 $m^2/g$ (measured with monosorb manufactured by QUANTA CHROME, hereinafter the same);

(A-2) $LiCoO_2$ having an average particle size of 18.4 μm and a specific surface area of 0.138 $m^2/g$.

$LiCoO_2$ (90 parts by weight), polyvinylidene fluoride (7 parts by weight, binding agent), acetylene black (3 parts by weight, conducting agent) and N-methyl-2-pyrrolidone (70 parts by weight) were mixed to give a slurry. This slurry was applied onto the both surfaces of a 20 μm thick aluminum foil to be a current collector, dried and press stretched.

As a result, two kinds of positive electrodes made of an aluminum foil having a 20 $mg/cm^2$ thick positive electrode active material composition layer per one side thereof, namely, LA-1 (positive electrode active material: A-1) and LA-2 (positive electrode active material: A-2) were prepared.

[Preparation of Negative Electrode]

Six kinds (C-1 to C-6) of graphitized carbon as shown in the following Table 4 were prepared as negative electrode active materials. Of these, C-1 to C-3 were encompassed in the present invention and C-4 to C-6 were for comparison.

Graphitized carbon (90 parts by weight), polyvinylidene fluoride (10 parts by weight, binding agent) and N-methyl-2-pyrrolidone (200 parts by weight) were mixed to give a slurry. This slurry was applied onto the both surfaces of a 14 μm thick copper foil to be a current collector, dried and press stretched.

As a result, six kinds of negative electrodes made of a copper foil having a 10.4 $mg/cm^2$ thick negative electrode active material composition layer per one side thereof, namely, GC-1 (negative electrode active material: C-1), GC-2 (negative electrode active material: C-2), GC-3 (negative electrode active material: C-3), GC-4 (negative electrode active material: C-4), GC-5 (negative electrode active material: C-5) and GC-6 (negative electrode active material: C-6) were prepared.

TABLE 4

| Negative electrode active material | Specific surface area (m²/g) | D002 (nm) | Lc (nm) |
|---|---|---|---|
| C-1 | 1.2 | 0.3366 | 42 |
| C-2 | 1.4 | 0.3361 | 80 |
| C-3 | 0.7 | 0.3359 | 58 |
| C-4 | 8.7 | 0.3354 | above 100 |
| C-5 | 1.9 | 0.3420 | 2 |
| C-6 | 4.5 | 0.3368 | 39 |

[Preparation of Electrolyte Solvent]

Various mixed solvents shown in the following Table 5 were prepared as the solvents for electrolyte. Of the 18 kinds of mixed solvents shown in Table 5, 11 kinds of MS-1 to MS-11 were used in the present invention, and 7 kinds of MS-12 to MS-18 were used for comparison.

TABLE 5

| Mixed solvent | Components of mixed solvent (% by volume) | | | | |
|---|---|---|---|---|---|
| | EC | PC | DEC | EMC | DMC |
| MS-1 | 6 | 9 | 4 | 31 | 50 |
| MS-2 | 8 | 12 | 4 | 29 | 47 |
| MS-3 | 10 | 15 | 4 | 27 | 44 |
| MS-4 | 8 | 7 | 4 | 31 | 50 |
| MS-5 | 11 | 9 | 4 | 29 | 47 |
| MS-6 | 14 | 11 | 4 | 27 | 44 |
| MS-7 | 11 | 5 | 4 | 31 | 50 |
| MS-8 | 14 | 6 | 4 | 29 | 47 |
| MS-9 | 18 | 8 | 4 | 27 | 44 |
| MS-10 | 11 | 9 | — | 33 | 47 |
| MS-11 | 11 | 9 | 33 | — | 47 |
| MS-12 | 32 | — | 19 | 36 | 14 |
| MS-13 | 37 | — | — | 63 | — |
| MS-14 | 42 | — | 36 | 17 | 5 |
| MS-15 | 25 | — | — | 50 | 25 |
| MS-16 | — | 25 | — | 50 | 25 |
| MS-17 | 30 | 10 | — | 60 | — |
| MS-18 | — | 42 | 36 | 17 | 5 |

Examples 11–21, Comparative Examples 11–17

The aforementioned positive electrode LA-1 and the negative electrode GC-1 were wound via a porous polyethylene-polypropylene composite separator to give a cylindrical lithium ion secondary battery (discharge capacity: 1300 mAh) having a height of 65 mm and an outer diameter of 18 mm. As the electrolyte, a solution obtained by dissolving 1 mol of $LiPF_6$ in a mixed solvent (1 L) shown in Table 5 was filled between the positive electrode and the negative electrode. The kinds of mixed solvents used in Examples and Comparative Examples are shown in Table 5.

Examples 22–25, Comparative Examples 18–20

In the same manner as in Examples 11–21 and Comparative Examples 11–17 and using the positive electrodes, negative electrodes and mixed solvents shown in Table 7, the positive electrode and the negative electrode were wound via a porous polyethylene-polypropylene composite separator to give a cylindrical lithium ion secondary battery (discharge capacity: 1300 mAh) having a height of 65 mm and an outer diameter of 18 mm. As the electrolyte, a solution obtained by dissolving 1 mol of $LiPF_6$ in a mixed solvent (1 L) was filled between the positive electrode and the negative electrode as in Example 11.

The lithium ion secondary batteries of the abovementioned Examples and Comparative Examples were measured for the charge and discharge cycle characteristic according to the following charge and discharge cycle test method, and discharge capacity retention (%) at 100th cycle, 200th cycle, 300th cycle, and 400th cycle was calculated. The results are shown in Table 6 for Examples 11–21 and Comparative Examples 11–17, and in Table 7 for Examples 22–25 and Comparative Examples 18–20. In Comparative Example 15 and Comparative Example 17, the decomposition of PC prevented the charge and discharge cycle test. In Comparative Example 18, the discharge capacity retention decreased to 38% at 100th cycle, when the test was stopped.

[Charge and Discharge Cycle Test Method]

One cycle consists of 2.5 hr charge under 2.6 mA constant current and 4.2 V constant voltage per 1 cm² of positive electrode, 1 hr rest after charge, discharge till terminal voltage of 3V under 2.6 mA constant current per 1 cm² of positive electrode, and 1 hr rest after discharge. This cycle was repeated 400 times at room temperature (20° C.). The discharge capacity (mA.H) was calculated from the discharge current and discharge hours at each cycle. The ratio of the discharge capacity at each cycle relative to the initial discharge capacity was taken as the discharge capacity retention (%).

TABLE 6

| | Positive electrode | Negative electrode | Mixed solvent | Discharge capacity retention (%) at cycle | | | |
|---|---|---|---|---|---|---|---|
| | | | | 100th cycle | 200th cycle | 300th cycle | 400th cycle |
| Ex. 11 | LA-1 | GC-1 | MS-1 | 88 | 84 | 77 | 72 |
| Ex. 12 | LA-1 | GC-1 | MS-2 | 88 | 83 | 77 | 73 |
| Ex. 13 | LA-1 | GC-1 | MS-3 | 88 | 81 | 74 | 67 |
| Ex. 14 | LA-1 | GC-1 | MS-4 | 87 | 82 | 74 | 69 |
| Ex. 15 | LA-1 | GC-1 | MS-5 | 90 | 81 | 76 | 70 |
| Ex. 16 | LA-1 | GC-1 | MS-6 | 88 | 76 | 70 | 67 |
| Ex. 17 | LA-1 | GC-1 | MS-7 | 86 | 76 | 68 | 63 |
| Ex. 18 | LA-1 | GC-1 | MS-8 | 86 | 75 | 68 | 60 |
| Ex. 19 | LA-1 | GC-1 | MS-9 | 86 | 75 | 68 | 60 |
| Ex. 20 | LA-1 | GC-1 | MS-10 | 86 | 78 | 70 | 67 |
| Ex. 21 | LA-1 | GC-1 | MS-11 | 88 | 80 | 72 | 69 |
| Com. Ex. 11 | LA-1 | GC-1 | MS-12 | 81 | 68 | 55 | 46 |
| Com. Ex. 12 | LA-1 | GC-1 | MS-13 | 79 | 57 | 47 | 38 |
| Com. Ex. 13 | LA-1 | GC-1 | MS-14 | 77 | 56 | 46 | 38 |
| Com. Ex. 14 | LA-1 | GC-1 | MS-15 | 84 | 70 | 58 | 52 |
| Com. Ex. 15 | LA-1 | GC-1 | MS-16 | — | — | — | — |
| Com. Ex. 16 | LA-1 | GC-1 | MS-17 | 84 | 68 | 53 | 40 |
| Com. Ex. 17 | LA-1 | GC-1 | MS-18 | — | — | — | — |

TABLE 7

| | Positive electrode | Negative electrode | Mixed solvent | Discharge capacity retention (%) at cycle | | | |
|---|---|---|---|---|---|---|---|
| | | | | 100th cycle | 200th cycle | 300th cycle | 400th cycle |
| Ex. 22 | LA-1 | GC-2 | MS-5 | 87 | 81 | 77 | 73 |
| Ex. 23 | LA-1 | GC-3 | MS-5 | 92 | 87 | 83 | 80 |
| Ex. 24 | LA-2 | GC-1 | MS-1 | 88 | 82 | 78 | 72 |
| Ex. 25 | LA-2 | GC-1 | MS-2 | 88 | 83 | 79 | 74 |
| Com. Ex. 18 | LA-1 | GC-4 | MS-5 | 38 | — | — | — |
| Com. Ex. 19 | LA-1 | GC-5 | MS-5 | 79 | 68 | 58 | 53 |

TABLE 7-continued

|  | Positive electrode | Negative electrode | Mixed solvent | Discharge capacity retention (%) at cycle | | | |
|---|---|---|---|---|---|---|---|
|  |  |  |  | 100th cycle | 200th cycle | 300th cycle | 400th cycle |
| Com. Ex. 20 | LA-1 | GC-6 | MS-5 | 71 | 62 | 52 | 47 |

As is evident from Table 6 and Table 7, all of the lithium ion secondary batteries of Examples 11–25 showed slow decrease in the discharge capacity retention as compared to Comparative Examples 11–20. The discharge capacity retention was lower than 60% in every Comparative Example at 400th cycle, but otherwise in every Example. Particularly notable is the fact that the lithium ion secondary battery of every Example using EC and PC showed markedly superior charge and discharge cycle characteristic as compared to Comparative Example 15 wherein MS-16 without EC was used, Comparative Examples 11 and 13 wherein MS-12 and MS-14 without PC were used, and Comparative Example 16 wherein MS-17 without DMC was used. This effect was evidently brought about by the concurrent use of EC and PC where graphitized carbon was used as the negative electrode active material.

As is evident from Table 7, moreover, charge and discharge cycle characteristic was insufficient when a negative electrode comprising graphitized carbon outside the range of the present invention was used. In Comparative Example 18 and Comparative Example 20, PC decomposed because of the use of graphitized carbon having an excess specific surface area and high crystallinity. Unlike Comparative Example 15 and Comparative Example 17, charging and discharging were possible due to the protecting film of EC. In Comparative Example 19, wherein graphitized carbon having low crystallinity (soft carbon) was used, PC did not decompose but the reversibility of intercalation reaction of lithium was insufficient, which in turn made the charge and discharge cycle characteristic insufficient.

Examples 26–29 and Comparative Examples 21, 22

Example 26

[Preparation of Positive Electrode]

LiCoO$_2$ (91 parts by weight) to be a positive electrode active material, which had an average particle size of 20 μm (measured with SALD-3000J), a specific surface area of 0.12 m$^2$/g and [20/(average particle size×specific surface area)] of 8.3, spherical graphitized carbon (MCMB 6-28, particle size 6 μm) to be a conductive material, KETZEN BLACK ECP (1 part by weight, particle size 0.01 μm), and polyvinylidene fluoride (PVdF) (3 parts by weight, binder) were homogeneously dispersed in N-methyl-2-pyrrolidone to give a slurry. This slurry was applied onto the both surfaces of a 20 μm thick aluminum foil to be a current collector, dried and press stretched to give a positive electrode made of an aluminum foil having 20 mg/cm$^2$ LiCoO$_2$ per one side thereof.

[Preparation of Negative Electrode]

Graphitized carbon (Melblonmilled FM-14) (95 parts by weight, negative electrode active material, specific surface area: 1.32 m$^2$/g, spacing of lattice planes (d002): not more than 0.3364 nm, crystallite size in the c-axis direction crystal lattice: 50 μm), polyvinylidene fluoride (PVdF) (5 parts by weight, negative electrode binder) and N-methyl-2-pyrrolidone (50 parts by weight) were mixed to give a slurry. This slurry was applied onto the both surfaces of a 14 μm thick copper foil to be a current collector, dried and press stretched to give a negative electrode.

Preparation of Electrolyte

In a mixed solvent of diethyl carbonate (4% by volume), ethylmethyl carbonate (29% by volume), ethylene carbonate (11% by volume), propylene carbonate (9% by volume) and dimethyl carbonate (47% by volume) was dissolved LiPF$_6$ to a concentration of 1.0 mol/L (relative to electrolyte after preparation) to give an electrolyte.

Assembly of Lithium Ion Secondary Battery

The positive electrode and the negative electrode prepared above were wound via a porous polyethylene-polypropylene composite separator and placed in a cylindrical battery can (outer diameter 18 mm, height 65 mm). The separator was impregnated with the electrolyte prepared above to give a lithium ion secondary battery of the present invention.

The lithium ion secondary batteries obtained above were subjected to the cycle characteristic test, low temperature characteristic test and storage characteristic test. The results are shown in Table 8.

Cycle Characteristic Test

The lithium ion secondary batteries obtained above were subjected to 500 cycles of 1 C/1 C charge and discharge at room temperature (20° C.). The discharge capacity [mA.H] at the first cycle and the 500th cycle was calculated from the discharge current and discharge hours. The discharge capacity [mA.H] at the 500th cycle was divided by the discharge capacity [mA.H] at the 1st cycle to give discharge capacity retention (%). The results are shown in Table 8.

Low Temperature Characteristic Test

The lithium ion secondary batteries obtained above were charged at room temperature and left standing at −35° C. for 24 hours in the atmosphere. The batteries were charged by flowing a 1 C (1600 mA) constant current until the voltage became 4.2 V, and then flowing a current at 4.2 V constant voltage for the total charge hours of 2.5 hours. The batteries were discharged at −35° C. in the atmosphere at 0.5 C (800 mAh)/2.5 V cut-off, and the discharge capacity (mA.H) at that time was calculated. The charge-discharge was conducted at room temperature (20° C.) under similar conditions and the discharge capacity (mA.H) was calculated. The discharge capacity [mA.H] at −35° C. was divided by the discharge capacity at room temperature to give discharge capacity retention (%). The results are shown in Table 8.

Storage Characteristic Test

The lithium ion secondary batteries obtained above were charged at room temperature and left standing at 60° C. for 40 days in the atmosphere. The batteries were charged by flowing a 1 C (1600 mA) constant current until the voltage became 4.2 V, and then flowing a current at 4.2 V constant voltage for the total charge period of 2.5 hours. The batteries were left standing at −5° C. in the atmosphere for 24 hours and discharged at −5° C. in the atmosphere at 1 C (1600 mAh)/2.5 V cut-off, and the discharge capacity (mA.H) at that time was calculated. The discharge capacity was divided by the RT discharge capacity (discharged at 1 C (1600 mAh)/2.5 V cut-off) to give discharge capacity retention (%). The results are shown in Table 8.

As used herein, by the RT discharge capacity is meant discharge capacity (mA.H) obtained by flowing a 1600 mA constant current until the voltage becomes 4.2 V, and then flowing a current at 4.2 V constant voltage for the total charge period of 2.5 hours, followed by discharge at 800 mA, 20° C. until the voltage becomes 2.5 V.

Example 27

In the same manner as in Example 26 except that LiCoO$_2$ having an average particle size of 16 μm and a specific surface area of 0.17 m²/g was used as the positive electrode active material, a lithium ion secondary battery was prepared. This lithium ion secondary battery was subjected to the cycle characteristic test, low temperature characteristic test and storage characteristic test, as in Example 26. The results are shown in Table 8.

Example 28

In the same manner as in Example 26 except that spherical graphitized carbon having a particle size of 4 μm and KETZEN BLACK having a particle size of 0.05 μm were used as the conductive material, a lithium ion secondary battery was prepared. This lithium ion secondary battery was subjected to the cycle characteristic test, low temperature characteristic test and storage characteristic test, as in Example 26. The results are shown in Table 8.

Example 29

In the same manner as in Example 26 except that a mixed solvent of diethyl carbonate (6% by volume), ethylmethyl carbonate (27% by volume), ethylene carbonate (9% by volume), propylene carbonate (10% by volume) and dimethyl carbonate (48% by volume) was used as the solvent for electrolyte, a lithium ion secondary battery was prepared. This lithium ion secondary battery was subjected to the cycle characteristic test, low temperature characteristic test and storage characteristic test, as in Example 26. The results are shown in Table 8.

Comparative Example 21

In the same manner as in Example 26 except that $LiCoO_2$ (average particle size 18 μm, specific surface area 0.19 m²/g, 20/(average particle size×specific surface area): 5.8) was used as the positive electrode active material, spherical graphitized carbon (MCMB 6-28, 6 parts by weight, particle size 3 μm) alone was used as the conductive material, and a mixed solvent of ethylene carbonate (30% by volume), propylene carbonate (30% by volume) and dimethyl carbonate (40% by volume) was used as the solvent for electrolyte, a lithium ion secondary battery was prepared. This lithium ion secondary battery was subjected to the cycle characteristic test, low temperature characteristic test and storage characteristic test, as in Example 26. The results are shown in Table 8.

Comparative Example 22

In the same manner as in Example 26 except that $LiCoO_2$ (average particle size 19 μm, specific surface area 0.10 m²/g, 20/(average particle size×specific surface area): 10.5) was used as the positive electrode active material, carbon black (6 parts by weight, particle size 0.01 μm) alone was used as the conductive material, and a mixed solvent of ethylene carbonate (20% by volume), propylene carbonate (20% by volume) and dimethyl carbonate (60% by volume) was used as the solvent for electrolyte, a lithium ion secondary battery was prepared. This lithium ion secondary battery was subjected to the cycle characteristic test, low temperature characteristic test and storage characteristic test, as in Example 26. The results are shown in Table 8.

TABLE 8

|  | Ex. 26 | Ex. 27 | Ex. 28 | Ex. 29 | Com. Ex. 21 | Com. Ex. 22 |
|---|---|---|---|---|---|---|
| [Cycle characteristic] discharge capacity retention (%) | 85 | 82 | 83 | 80 | 50 | 40 |
| [Low temperature characteristic] discharge capacity retention (%) | 88 | 83 | 81 | 81 | No discharge | 20 |
| [Storage characteristic] discharge capacity retention (%) | 80 | 82 | 82 | 81 | No discharge | No discharge |

From the above-mentioned Examples 26–29 and Comparative Examples 21, 22, it is evident that the use of the lithium ion secondary battery of the present invention results in marked improvements in the charge and discharge cycle characteristic and storage characteristic, as well as low temperature characteristic.

Examples 30–38 and Comparative Examples 23–27
[Preparation of Electrolyte]

The electrolyte solvents for the lithium ion secondary batteries of Examples 30–38 and Comparative Examples 23–27 were prepared at the mixing ratios shown in Table 9. $LiPF_6$ was dissolved in each solvent to the concentration shown in Table 9 to give an electrolyte for each lithium ion secondary battery.

[Preparation of Positive Electrode]

$LiCoO_2$ (91 parts by weight, positive electrode active material) having an average particle size of 17.5 μm (measured with SALD-3000J) and a specific surface area of 0.154 m²/g, graphite fine powder (6 parts by weight, positive electrode conductive material), polyvinylidene fluoride (3 parts by weight, positive electrode binder) and N-methyl-2-pyrrolidone (50 parts by weight) were mixed to give a slurry. This slurry was applied onto the both surfaces of a 20 μm thick aluminum foil (550 mm×55 mm) to be a current collector, dried and press stretched to give a positive electrode. The positive electrode active material layer had a filling rate of 70%. The positive electrode was produced in 13 sets for the lithium ion secondary batteries of Examples 30–37 and Comparative Examples 23–27.

In the same manner as above except that LiCo having an average particle size of 16.9 μm and a specific surface area of 0.138 m²/g was used, a different positive electrode was prepared. This positive electrode showed the filling rate of the positive electrode active material layer of 74%. This positive electrode was used for the lithium ion secondary battery of Example 38.

[Preparation of Negative Electrode]

Carbon fiber (95 parts by weight, negative electrode active material) having an average fiber length of 40 μm and an average fiber diameter of 8.8 μm, polyvinylidene fluoride (5 parts by weight, negative electrode binder) and N-methyl-2-pyrrolidone (100 parts by weight) were mixed to give a slurry. This slurry was applied onto the both surfaces of a 14 μm thick copper foil (595 mm×57 mm) to be a current collector, dried and press stretched to give a negative electrode. The negative electrode active material layer had a filling rate of 69%. The negative electrode was produced in 13 sets for the lithium ion secondary batteries of Examples 30–37 and Comparative Examples 23–27.

In the same manner as above except that a carbon fiber having an average fiber length of 35 μm and an average fiber diameter of 10 μm was used, a different negative electrode was prepared. This negative electrode showed the filling rate of the negative electrode active material layer of 72%. This negative electrode was used for the lithium ion secondary battery of Example 38.

[Assembly of Lithium Ion Secondary Battery]

The positive electrode and the negative electrode prepared above were wound via a porous polyethylene-polypropylene composite separator and placed in a cylindrical battery can (outer diameter 18 mm, height 65 mm). The electrolyte prepared above was filled between the positive electrode and the negative electrode to give lithium ion secondary batteries (designed capacity: 1600 mAh),of Examples 30–38 and Comparative Examples 23–27.

[Evaluation]

The lithium ion secondary batteries of Examples 30–38 and Comparative Examples 23–27 obtained above were charged at room temperature. They were charged with a 1 C (1600 mA) constant current until the voltage became 4.2 V and then charged with a 4.2 V constant voltage. When the charge period reached 2.5 hours, charging was stopped. The lithium ion secondary batteries were placed in a thermostatic tank at −35° C. and discharged at 0.5 C (800 mAh)/2.5 V cut-off.

The discharge current and discharge hours at this time of each lithium ion secondary battery were measured, and discharge capacity (mAh) was calculated. The discharge capacity (mAh) was divided by the discharge capacity (mAh) at the time of discharge at room temperature and multiplied by 100 to give discharge capacity retention (%). The results are shown in Table 9. The intermediate voltage obtained by dividing the energy (mWh) at the time of discharge by discharge capacity (mAh) at the time of discharge is also shown in Table 9.

temperature, as compared to the lithium ion secondary batteries of Comparative Examples 23–27. By adjusting the mixing ratio of each component of the electrolyte, the low temperature characteristic can be improved.

Example 39, Comparative Examples 28–30

Example 39

[Preparation of Positive Electrode]

LiCoCO$_2$ (91 parts by weight) to be a positive electrode active material, which had an average particle size of 18 μm (measured with SALD-3000J), a specific surface area of 0.14 m$^2$/g and [20/(average particle size×specific surface area)] of 7.9, spherical graphitized carbon (MCMB 6-28, 5 parts by weight, particle size 6 μm) to be a conductive material, KETZEN BLACK (1 part by weight, particle size not more than 0.1 μm), and polyvinylidene fluoride (PVdF) (3 parts by weight, binder) were homogeneously dispersed in N-methyl-2-pyrrolidone to give a slurry. This slurry was applied onto the both surfaces of a 20 μm thick aluminum foil to be a current collector, dried and press stretched to give a positive electrode made of an aluminum foil having 20 mg/cm$^2$ thick LiCoO$_2$ per one side thereof.

[Preparation of Negative Electrode]

Fibrous graphitized carbon (Melblonmilled FM-14) (95 parts by weight, negative electrode active material), polyvinylidene fluoride PVdF) (5 parts by weight, negative electrode binder) and N-methyl-2-pyrrolidone (50 parts by weight) were mixed to give a slurry. This slurry was applied onto the both surfaces of a 14 μm thick copper foil to be a current collector, dried and press stretched to give a negative electrode.

[Preparation of Electrolyte]

An electrolyte was obtained by dissolving 1 mol of LiPF$_6$ in a mixed solvent (1 L),of ethylene carbonate (EC, 11 Vol %), propylene carbonate (PC, 9 Vol %), diethyl carbonate (DEC, 4 Vol %), ethylmethyl carbonate (EMC, 29 Vol %) and dimethyl carbonate (DMC, 47 Vol %).

TABLE 9

| | Electrolyte | | | | | Discharge capacity | Intermediate |
| --- | --- | --- | --- | --- | --- | --- | --- |
| | LiPF$_6$ mol/L | EC volume % | PC volume % | DEC volume % | EMC volume % | DMC volume % | retention (%) | voltage (V) |
| Ex. 30 | 1 | 8 | 12 | 15 | 30 | 35 | 80 | 2.92 |
| Com. Ex. 23 | 1 | 25 | 0 | 0 | 50 | 25 | 45 | 2.77 |
| Ex. 31 | 1.4 | 8 | 12 | 17 | 29 | 34 | 71 | 2.94 |
| Ex. 32 | 1.2 | 8 | 12 | 17 | 29 | 34 | 74 | 2.98 |
| Ex. 33 | 1.0 | 8 | 12 | 17 | 29 | 34 | 77 | 2.99 |
| Ex. 34 | 0.8 | 8 | 12 | 17 | 29 | 34 | 66 | 2.84 |
| Com. Ex. 24 | 1 | 0 | 10 | 15 | 30 | 35 | No function | — |
| Com. Ex. 25 | 1 | 10 | 0 | 15 | 40 | 35 | 52 | 2.82 |
| Ex. 35 | 1 | 8 | 12 | 0 | 45 | 35 | 76 | 2.90 |
| Ex. 36 | 1 | 8 | 12 | 10 | 35 | 35 | 76 | 2.89 |
| Ex. 37 | 1 | 8 | 12 | 15 | 30 | 35 | 78 | 2.91 |
| Ex. 38 | 1 | 10 | 10 | 0 | 40 | 40 | 77 | 2.93 |
| Com. Ex. 26 | 1 | 10 | 10 | 0 | 30 | 50 | 2 | 2.81 |
| Com. Ex. 27 | 1 | 10 | 10 | 0 | 60 | 20 | 43 | 2.75 |

As is evident from Table 9, the lithium ion secondary batteries of Examples 30–38 can inhibit lowering of discharge capacity (mAh) and intermediate voltage at low

[Assembly of Lithium Ion Secondary Battery]

The positive electrode and the negative electrode prepared above were wound via a porous polyethylene-polypropylene composite separator and placed in a cylindrical battery can (outer diameter 18 mm, height 65 mm). The separator was impregnated with the electrolyte prepared above to give a lithium ion secondary battery of the present invention.
[Discharge Test]

The lithium ion secondary batteries obtained above were charged at room temperature. They were charged with a 1600 mA constant current until the voltage became 4.2 V and then charged with a 4.2 V constant voltage. When the charge period reached 3.5 hours, charging was stopped. The lithium ion secondary batteries were left standing in the atmosphere at −20° C. for 24 hours. The batteries were discharged in the atmosphere at −20° C. at 1.0 C (1600 mAh)/2.5 V cut-off. The discharge capacity rate (%) and discharge voltage (V) at that time were measured and plotted in a graph wherein the axis of abscissa was discharge capacity rate (%) and the axis of ordinate was discharge voltage (V). As a result, the graph showed a backslash without the minimum value, as in FIG. 1, where drastic voltage fall was not found.

The discharge capacity rate (%) is relative to the discharge capacity (100%) obtained when 1 C discharge is conducted at 20° C. and cut-off voltage of 2.5 V. The discharge capacity retention (%) and intermediate voltage (V) were calculated, the results of which are shown in Table 10. The discharge capacity retention (%) is obtained by dividing the discharge capacity (mA.H) at the time the voltage reached the cut-off voltage (2.5 V) by 1 C discharge at −20° C., by the discharge capacity (mA.H) at the time the voltage reached the cut-off voltage (2.5 V) by 1 C discharge at 20° C. The intermediate voltage is obtained from 50% of the discharge capacity (mA.H) at the time the voltage reached the cut-off voltage (2.5 V) by 1.0 C discharge at −20° C., and the discharge energy (mW.H) at that time.

Comparative Example 28

In the same manner as in Example 39 except that spherical graphitized carbon (6 parts by weight) alone having a particle size of 3 $\mu$m was used as the conductive material for positive electrode to give a positive electrode, a lithium ion secondary battery was prepared. The obtained lithium ion secondary battery was discharged in the same manner as in Example 39, and plotted in a graph wherein the axis of abscissa was the discharge capacity rate (%) and the axis of ordinate was discharge voltage (V). As a result, the graph showed the minimum value and the maximum value appearing in the discharge capacity rate increasing direction. The difference (ΔV1) between the minimum value and the maximum value was 0.33 (V) as shown in Table 10. The minimum value was 2.80 (V), the difference (ΔV2) between the minimum value and the discharge voltage, when discharge capacity rate was 0%, was 0.30 (V), showing a sudden fall in the voltage. The discharge capacity retention (%) and the intermediate voltage (V) were also calculated as in Example 39 (Table 10).

Comparative Example 29

In the same manner as in Example 39 except that carbon black (1 part by weight) alone having a particle size of 0.1 $\mu$m was used as the conductive material to give a positive electrode, a lithium ion secondary battery was prepared. The obtained lithium ion secondary battery was discharged in the same manner as in Example 39, and plotted in a graph wherein the axis of abscissa was the discharge capacity rate (%) and the axis of ordinate was discharge voltage (V). As a result, the graph showed the minimum value and the maximum value appearing in the discharge capacity rate increasing direction, as in Comparative Example 28. The difference (ΔV1) between the minimum value and the maximum value was 0.28 (V) as shown in Table 10. The minimum value was 2.90 (V), the difference (ΔV2), between the minimum value and the discharge voltage when discharge capacity rate was 0% was 0.60 (V), showing a sudden fall in the voltage as in Comparative Example 28. The discharge capacity retention (%) and the intermediate voltage (V) were also calculated as in Example 39 (Table 10).

Comparative Example 30

In the same manner as in Example 39 except that LiCoO$_2$ type active material (91 parts by weight) having an average particle size of 18 $\mu$m, a specific surface area of 0.20 m$^2$/g (measured with SALD-3000J) and [20/(average particle size×specific surface area)] of 5.6 was used as the positive electrode active material to give a positive electrode, a lithium ion secondary battery was prepared. The obtained lithium ion secondary battery was discharged in the same manner as in Example 39, but discharge did not occur and a graph could not be drawn.

TABLE 10

|  | Ex. 39 | Com. Ex. 28 | Com. Ex. 29 | Com. Ex. 30 |
| --- | --- | --- | --- | --- |
| ΔV$_1$ (V) | No minimum value | 0.33 | 0.28 | Discharge not possible |
| ΔV$_2$ (V) |  | 0.30 | 0.60 | not possible |
| Minimum value (V) |  | 2.80 | 2.90 | possible |
| Intermediate voltage (V) | 3.20 | 2.83 | 2.91 | Discharge not possible |
| Discharge capacity retention (%) | 94 | 36 | 52 | Discharge not possible |

From the results of the above-mentioned Table 10, it is evident that the use of the lithium ion secondary batteries of the Examples results in inhibition of a sudden fall in the discharge voltage at extremely low temperature, as compared to the lithium ion secondary batteries of Comparative Examples 28–30. In addition, lowering of the discharge capacity (mAh) and intermediate voltage can be inhibited.

This application is based on application Nos. 133497/1999, 219326/1999, 223089/1999, 238785/1999, 290300/1999 and 324602/1999 filed in Japan, the contents of which are incorporated hereinto by reference.

What is claimed is:

1. A positive electrode active material composition comprising at least (i) an active material comprising a particulate Li-transition metal composite oxide having (a) an average particle size of 10 $\mu$m–25 $\mu$m and (b) a specific surface area (m$^2$/g) and an average particle size ($\mu$m) that satisfy the following formula:

7≦[20/(specific surface area×average particle size)]≦9, (ii) a particulate conductive material having a particle size of not less than 3 $\mu$m and, (iii) a particulate conductive material having a particle size of not more than 2 $\mu$m.

2. The Li-transition metal composite oxide of claim 1, which is obtained by heat treating particles of a Li-transition metal composite oxide at a high temperature of 400–750° C. for 0.5–50 hours.

3. The Li-transition metal composite oxide of claim 2, which is obtained by mixing a lithium compound and a transition metal compound at an atomic ratio of lithium:transition metal of 1:1–0.8:1, heating the mixture at a temperature of 700° C.–1200° C. in the atmosphere for 3 hours–50 hours, and pulverizing the resulting reaction product.

4. The Li-transition metal composite oxide of claim 3, wherein the transition metal compound comprises cobalt, or cobalt and at least one other transition metal.

5. A positive electrode active material for a non-aqueous electrolyte secondary battery, which comprises the Li-transition metal composite oxide of claim 1.

6. A lithium ion secondary battery comprising the positive electrode active material of claim 5.

7. The positive electrode active material composition of claim 1, wherein the particulate conductive material is a carbon material.

8. The positive electrode active material composition of claim 1, wherein the particulate conductive material having a particle size of not more than 2 $\mu$m is contained in an amount of 1 part by weight–200 parts by weight per 100 parts by weight of the particulate conductive material having a particle size of not less than 3 $\mu$m.

9. The positive electrode active material composition of claim 1, wherein the Li-transition metal composite oxide is a Li—Co type composite oxide.

10. A lithium ion secondary battery comprising the positive electrode active material composition of claim 1.

11. A lithium ion secondary battery comprising the positive electrode active material composition of claim 1 and a negative electrode active material comprising graphitized carbon having a specific surface area of not more than 2.0 m$^2$/g, a spacing of lattice planes (d002) of not more than 0.3380 nm and a crystallite size in the c-axis direction (Lc) of not less than 30 nm, and a mixed solvent for an electrolyte, which comprises ethylene carbonate, propylene carbonate, dimethyl carbonate and at least one member selected from the group consisting of diethyl carbonate and ethylmethyl carbonate.

12. The lithium ion secondary battery of claim 11, wherein the mixed solvent comprises the one member in a proportion of 25% by volume–50% by volume, ethylene carbonate in a proportion of 4% by volume–20% by volume, propylene carbonate in a proportion of 3% by volume–17% by volume, and dimethyl carbonate in a proportion of more than 40% by volume and not more than 60% by volume.

13. The lithium ion secondary battery of claim 11, wherein the positive electrode active material comprises a Li—Co type composite oxide.

14. The lithium ion secondary battery of claim 13, wherein the Li—Co type composite oxide is LiCoO$_2$.

15. A lithium ion secondary battery comprising the positive electrode active material composition of claim 1 and a mixed solvent for an electrolyte, which comprises at least one member selected from the group consisting of diethyl carbonate and ethylmethyl carbonate in a proportion of 40% by volume–50% by volume, ethylene carbonate in a proportion of 4% by volume–10% by volume, propylene carbonate in a proportion of 10% by volume–17% by volume, and dimethyl carbonate in a proportion of 30% by volume–40% by volume.

16. The lithium ion secondary battery of claim 15, further comprising a positive electrode active material layer having a filling rate of 65%–85% and a negative electrode active material layer having a filling rate of 65%–85%.

17. A lithium ion secondary battery comprising (i) a positive electrode active material comprising a particulate Li-transition metal composite oxide having an average particle size of not less than 10 $\mu$m, wherein [20/(average particle size×specific surface area)]=7–9;

(ii) a conductive material which is a mixture of a particulate conductive material having a particle size of not less than 3 $\mu$m and a particulate conductive material having a particle size of not more than 2 $\mu$m, or a mixture of a particulate conductive material having a particle size of not less than 3 $\mu$m and a fibrous conductive material having an aspect ratio of 3 or above and a fiber diameter of not more than 2 $\mu$m;

(iii) a negative electrode active material comprising graphitized carbon having a specific surface area of not more than 2.0 m$^2$/g, a spacing of lattice planes of not more than 0.3380 nm and a crystallite size in the c-axis direction of not less than 30 nm; and (iv) a mixed solvent for an electrolyte, which comprises ethylene carbonate, propylene carbonate, dimethyl carbonate and at least one member selected from the group consisting of diethyl carbonate and ethylmethyl carbonate.

18. The lithium ion secondary battery of claim 17, wherein the mixed solvent comprises the one member in a proportion of 25% by volume–50% by volume, ethylene carbonate in a proportion of 4% by volume–20% by volume, propylene carbonate in a proportion of 3% by volume–17% by volume, and dimethyl carbonate in a proportion of more than 40% by volume and not more than 60% by volume.

19. The lithium ion secondary battery of claim 18, wherein the Li-transition metal composite oxide is a Li—Co type composite oxide.

20. A lithium ion secondary battery comprising (i) a positive electrode active material comprising a particulate Li-transition metal composite oxide having an average particle size of not less than 10, wherein [(20/(average particle size×specific surface area)]=7–9; and (ii) a conductive material which is a mixture of a particulate conductive material having a particle size of not less than 3 $\mu$m and a particulate conductive material having a particle size of not more than 2 $\mu$m, or a mixture of a particulate conductive material having a particle size of not less than 3 $\mu$m and a fibrous conductive material having an aspect ratio of 3 or above and a fiber diameter of not more than 2 $\mu$m.

21. The lithium ion secondary battery of claim 20, wherein the Li-transition metal composite oxide is a Li—Co type composite oxide.

\* \* \* \* \*